RECORDING AND TRANSLATING DEVICE

Filed March 26, 1951 7 Sheets-Sheet 1

Inventor:
John Victor Nelson,
by Thos. B. Graves Jr.
Atty.

RECORDING AND TRANSLATING DEVICE

Filed March 26, 1951 7 Sheets-Sheet 2

Inventor:
John Victor Nelson,
by Thos. G. [signature]
Att'y.

Inventor:
John Victor Nelson
by [signature]
Atty.

July 14, 1953 J. V. NELSON 2,645,495

RECORDING AND TRANSLATING DEVICE

Filed March 26, 1951 7 Sheets-Sheet 4

Inventor:
John Victor Nelson,
by Tho. O. [signature]
Atty

July 14, 1953 J. V. NELSON 2,645,495

RECORDING AND TRANSLATING DEVICE

Filed March 26, 1951 7 Sheets-Sheet 5

Inventor:
John Victor Nelson,
by Tho. Q. … Att'y

Inventor:
John Victor Nelson,
by Geo. A. [signature]
Atty.

RECORDING AND TRANSLATING DEVICE

Filed March 26, 1951

Inventor:
John Victor Nelson,
by [signature]
Atty.

Patented July 14, 1953 2,645,495

UNITED STATES PATENT OFFICE 2,645,495

RECORDING AND TRANSLATING DEVICE

John Victor Nelson, Elmhurst, Ill., assignor to Krag Steel Products, Inc., Chicago, Ill., a corporation of Illinois Application March 26, 1951, Serial No. 217,513

9 Claims. (Cl. 274—4)

This invention relates to improvements in recording and translating devices. Specifically the invention relates to improvements in devices for recording and translating or playing by use of magnetic type recordings, either of the tape or the wire type. The improvements herein disclosed are useful for devices intended either for making recordings or for translating recordings previously made, or for both of such operations as required.

A principal feature and object of the present invention is to provide a recorder of simple design and construction, and which can be constructed according to well understood and widely used shop practices and operations, and at low cost. In this connection it is an object to provide a design and construction in which many of the parts are formed of sheet metal stampings and die cutting and die forming operations, and by punch press operations to a large extent. It is a further object to provide a design and construction such that many or all of the parts may be of standardized form and largely interchangeable, a design and construction such that the assembling operations may be performed simply and expeditiously and with largely unskilled operators, and according to a simple plan of assembly.

A further object of the invention is to provide a design and construction which shall include provision for such different tape or wire movements as are needed to permit the various speeds, both forward and backward, as needed, to permit forward movements either for translation during such movements or without translation, as when it is desired to advance the record to a further position where replaying will be recommenced, to make provision for effecting various of the movements at either of two or more speeds as selected by the operator, and to effect various other record movements as will hereinafter appear in detail.

A further feature and object of the invention relates to the provision of elements and constructions such as to effect the record movements under very excellent control, regardless of whether such movements be at slow or high speed. Also, to make provision for effecting such movements under excellent control when passing from a high speed condition to a lower speed condition. In this connection it is noted that the recording, generally of the tape type, but also of the wire type, is effected by passing the tape or wire past a translating head which is provided with suitable magnetic sensing elements, and during such movement the tape or wire is drawn from one reel and wound onto another reel. These reels are of size appropriate to accommodate such amount of tape or wire as may be desired; but in many cases the reels are of flange diameters as great as 6½ to 7 inches or even more. When such a reel is filled even partially with tape or wire it has a very considerable mass and a proportionately large momentum when rotating at speed. When drawing the tape or wire from one reel onto the other reel at any given rate of tape movement the rotational speed of the reel from which the record is being drawn increases as the amount of record on such reel decreases, due to the decreasing diameter of the record remaining on such reel, so that when more than one-half of the record has been shifted to the receiving reel the rotational speed of the delivering reel rapidly becomes much greater than that of the receiving reel. This condition finally results in high rotational speeds of the delivery reel, such that the momentum of such reel is very large, considering the nature of the device. If, under such conditions the receiving reel be suddenly stopped or even if its rate of rotation be suddenly reduced, as when passing from an advancing tape condition in which the tape is merely being advanced without playing to a condition in which playing is resumed, the momentum of the delivering reel will cause said reel to continue its rotations at excess speed, and this will result in delivery of record to the sensing head at rate greater than the record is being taken up by the receiving reel. Under these conditions loose record will accumulate, with corresponding troubles such as tangling of the tape, or improper movement of the tape past the sensing head, and other troubles will be evident.

It is a further object of the present invention to make provision for maintaining the tape or other record under proper tension at all times, especially within the zone of movement of such record past the sensing unit, so that such troubles as just above referred to will be avoided. During normal forward drive for translation of the record it is desirable to maintain a slight tension on the tape, sufficient to ensure that the tape passing the sensing head shall be taut and shall pass smoothly. To this end I have made provision for ensuring and producing a continuous and smooth frictional resistance to the rotation of the delivering reel, so that such frictional resistance will have to be overcome in order to withdraw the tape from such reel, thus imposing a continuous tension on the tape during the translating movement past the sensing head. In like manner, during rewinding operations, wherein the tape is being rewound onto the "delivering" reel by drawing it from the "receiving" reel, it is desirable to ensure that the tape shall be retained under such degree of tension as to ensure smooth rewinding operations. To this end I have made provision for ensuring and providing a continuous and smooth frictional resistance to the rotation of the "receiving" reel under rewinding conditions.

It is also noted that during translating movements of the tape or other record the rate of such movement past the sensing head should be uniform at the selected rate of translation. That is, the rate of record travel should be uniform past the sensing head, whether such rate be slow or fast as pre-set by the user of the device. The travel of the tape past the sensing head is effected by rotational drive to the receiving reel. In order that the rate of travel past the sensing head shall be uniform at the selected rate the reel must travel at a varying rate in revolutions per minute since the effective diameter of the tape or wire on such reel increases as more and more of the record accumulates on such reel. It is, however, desirable to effect drive through the medium of a simple driving element, and without need of providing for a varying rate of rotation of such element as the effective diameter of the receiving reel increases. That is, it is desirable to effect drive of the receiving reel from a driving element whose rotational rate is constant. This requires the interposition of a yieldable driving connection from such constant rate driving element to the varying rate reel. Such a yieldable driving connection I have provided in the form of a frictional drive between these parts, which frictional drive is of sufficient driving effect to ensure dependable drive of the receiving reel at all times during translation, but is capable of yielding at all times, to allow the driving element to progress at greater rate than the driven rate of the reel.

The rotational rate of the driving element just referred to is high enough to ensure take up of the record always at that rate which is pre-set by the user, even when the amount of record on the reel is small, with correspondingly small effective diameter. Under these conditions the rate of slip is low when the amount of record on the reel is small, and as the operation progresses, with corresponding increase of effective diameter of the receiving reel, the rate of slip increases, due to the fact that the amount of record taken onto such reel for each rotation thereof increases. The driving element is, however driven at such rate that there shall be some small amount of slip between it and the receiving reel, even when the amount of record on such reel is small, thus ensuring that there shall be some slip at all times during drive. This will not only ensure that the receiving reel shall always rotate fast enough to take the record as fast as delivered to it, but will also ensure that the pull exerted on such tape shall always be continuous, and smooth.

I have stated that the travel of the tape or wire past the sensing head is by rotational drive to the receiving reel. This rotational drive is effected by use of a small spindle of uniformly driven rate against which the tape is pressed during the translation or playing operation. This spindle is driven at such uniform rate as selected and pre-set by the user, so that the rate of playing is pre-selected. The pressing engagement between the tape and this spindle is sufficient to ensure good control of the tape by the spindle, and to prevent slip at this point. Thus the rate of drive is surely controlled. From this drive spindle the tape passes to the receiving reel, whose function is that of taking up the tape as delivered to it. Since this receiving reel is being frictionally driven by a driving element rotating at a rate faster than the take up rate at which the reel ever rotates, it is evident that such reel always exerts a pulling effect on the tape being delivered from the spindle, but the frictional drive is not great enough to draw the tape past such spindle faster than the delivery rate of the spindle; that is, no slip ever occurs at the position of such spindle.

Means are provided for pressing the tape against this spindle. Such means takes the form of a presser roller. Means are provided for moving such presser roller into pressing engagement with the tape during playing operations, to press the tape into engagement with the spindle, and for moving the presser roller away from the tape during various other operating conditions. Thus, such presser roller is moved away from the tape (and from the spindle) during the "stop" condition, during the non-playing "Advance" conditions, and during the "Re-wind" conditions. Such results are desired since the only time when the control of the tape movements should occur is during a playing operation. At all other times the tape should be and is free to move past the spindle (and past the sensing head) without control by the spindle.

There is also provided a tape guide for ensuring good control of the tape during its playing progress past the sensing head. This is desirable in order to ensure good and faithful translation; but while I have shown and shall generally describe such tape guide herein I do not claim it as any portion of the present invention as respects the details of design and construction thereof. These comprise the subject-matter of another application for Letters Patent filed by another inventor.

Now I have previously referred to the provision of frictional drive to the "Receiving" reel from a driving element, and I have also referred to the provision of a frictional resistance to the "Delivering" reel. In case of a sudden stoppage of the device, as when throwing the control to the "Stop" position, or when changing from one speed to another, these frictional elements will tend to slow down or stop the rotation of their respective reels. However, such frictional control is not large enough to cause very quick or sudden stoppage of rotation, so that it has been found very desirable or even necessary to make other provision for effecting such stoppage. It is therefore a further and important feature and object of the present invention to provide suitable brakes for the two reels to control and arrest their rotational movements at the proper times.

I have provided one such brake acting on each of the reels, together with suitable means to move said brakes into and out of braking positions at proper times, and under proper settings of the device. These brake controls are so related to the other elements that only the brake on a reel from which tape is being or has been drawn will ever be actuated, leaving the other reel unbraked at such time. Thus, when the device has been operating for "Re-wind" drawing tape from the "Receiving" reel at relatively high speed, as the control is then thrown to another position, the brake on the "Receiving" reel is immediately set, to arrest rotation of such reel, but without braking the reel to which tape has been moving, the "Delivering" reel. This sudden braking of the "Receiving" reel will retain the tape under tension, and will cause the non-braked reel to come to rest by reason of the tension thus created in the tape, and will thus prevent any over-running of the tape during the stopping operation. Or again, when the device has been operating for "Fast Advance" of the tape (without playing), drawing tape from the "Delivering" reel to the "Receiving" reel at high speed (so as to effect a fast advance to some other tape location), and the device is then moved to another control position, such that the rate of tape advance is slowed or even stopped, the brake of the "Delivering" reel is set to thus suddenly impose an additional tension on the tape, and to ensure that fouling of the tape shall not occur. These brake controls are so effected and are so interconnected with the control device and other parts that the proper brake operations are effected automatically and in proper manner.

In order to effect most faithful translation of the recorded signals it is important that the tape on which the recording is effected shall be moved past the sensing head at a very uniform speed during translation. Slight irregularities in rate of such movement will be reflected in amplified form in the speaker or other sound producer. It is a further object of the present invention to ensure extremely rigid control of the rate of tape travel. To this end I have provided a flywheel element in direct connection with the tape drive spindle already referred to, so that the rotational movements of that spindle shall be under accurate control. The mass and the rotational inertia of this flywheel are many times the corresponding factors of the drive spindle and shaft, so that correspondingly great control of the spindle rotation is effected. To further improve this relationship I have formed the spindle as an extension of the shaft of this flywheel itself.

A further feature of the present invention relates to the means whereby drives between the several elements are effected for the several control positions. Such drives are effected frictionally by rotational drives through the medium of friction drive wheels. These various drives are in all cases effected by engagements of rubber or like peripheried wheels with steel or other suitable metalled periphery wheels. By this means of rubber to metal, or vice versa, in all cases slip is effectively avoided.

A further feature of the present invention relates to the provision of a very simple control means for bringing the various elements into the several combinations desired. This control means includes a simple slide of cam form whose position is determined from time to time by movement of the main control element to its several positions.

A further and important feature and object of the present invention relates to the provision of improved means to effect the necessary changes in drives from the motor to the various driven elements in order to effect the desired changes in speeds of drive and directions in which the elements are to be driven. In this connection said elements are driven through friction wheel drives including engagement of rubber faced wheels with steel or other metal faced elements. It is an object of the invention to provide improved means to support these elements in such manner that the proper elements may be shifted laterally into and out of engagement with the companion elements to effect the desired driving changes.

In connection with the foregoing it is a further object of the invention to provide sheet metal slides for the several shiftable elements and on which slides said elements are journalled, so that shift of said slides will effect the desired movements of the driving and driven elements. It is a further object to so form these slides that they may be easily and quickly inserted into operative positions on the common supporting element during assembly of the unit. It is a further object to so form these slides that when inserted into operative positions on the common support each slide shall be locked into its position so as to prevent unintentional disengagement of such slide from the supporting element, while at the same time permitting the necessary movements of said slide elements to be executed under proper control.

Other objects and uses of the invention will appear from a detailed description of the same which consists in the features of construction and combinations of parts hereinafter described and claimed.

In the drawings:

(Figures 1, 2, 3 and 4 are shown on approximately forty percent scale size);

Figure 5:
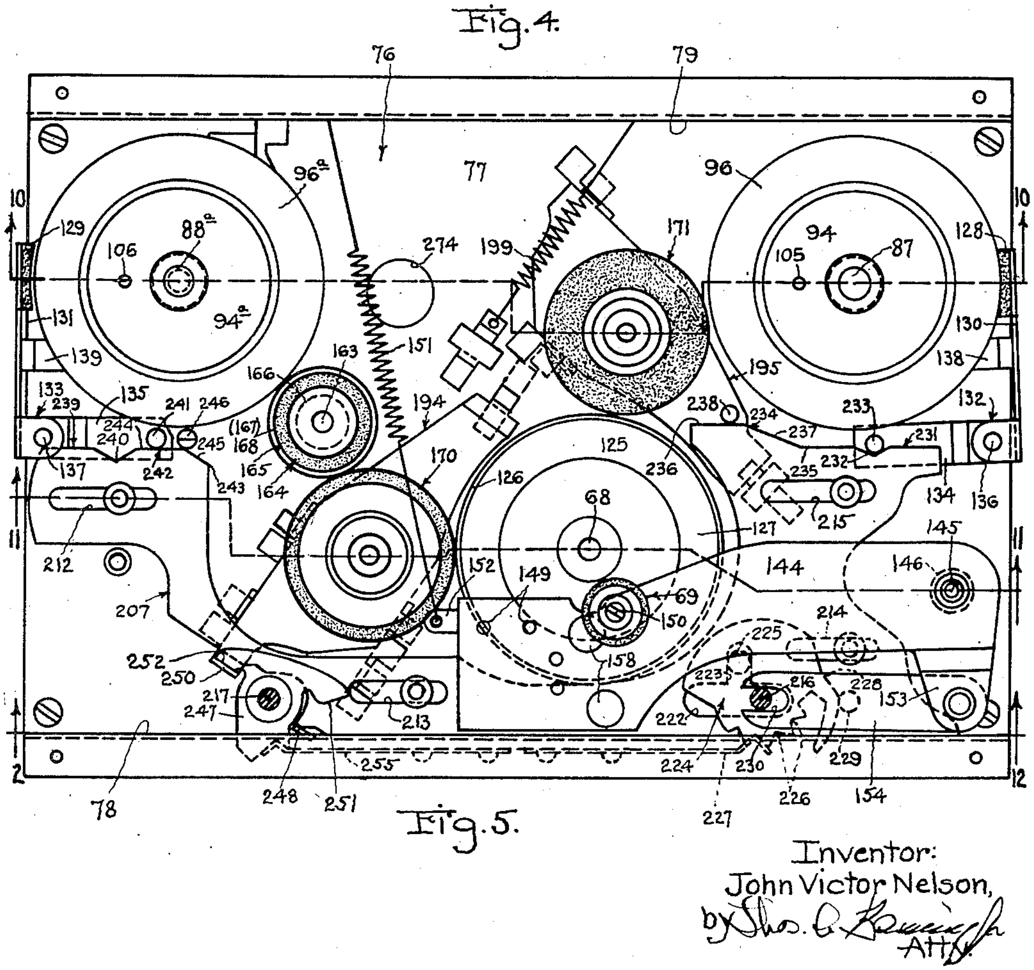
Figure 5 shows a plan view of various of the operating parts, with the upper support plate removed; and is a horizontal section taken on the lines 5—5 of Figures 13 and 14, looking in the directions of the arrows.
Figures 6, 7:
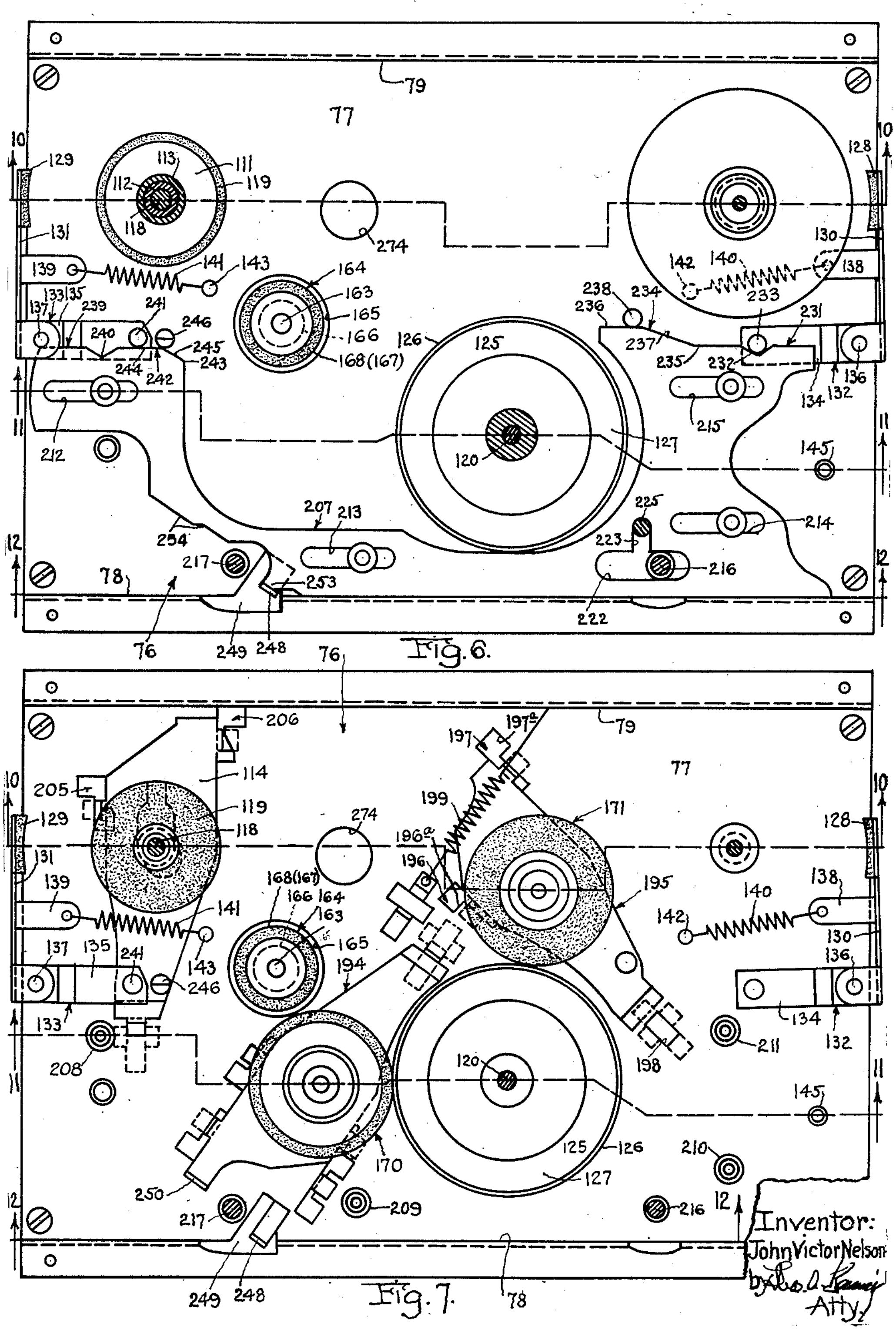
Figure 6 shows a plan view corresponding to Figure 5, but with the two reel supports removed, and with the bell crank which carries the presser roller and the tape guide removed; and is a horizontal section taken on the lines 6—6 of Figures 13 and 14, looking in the directions of the arrows.
Figure 8:
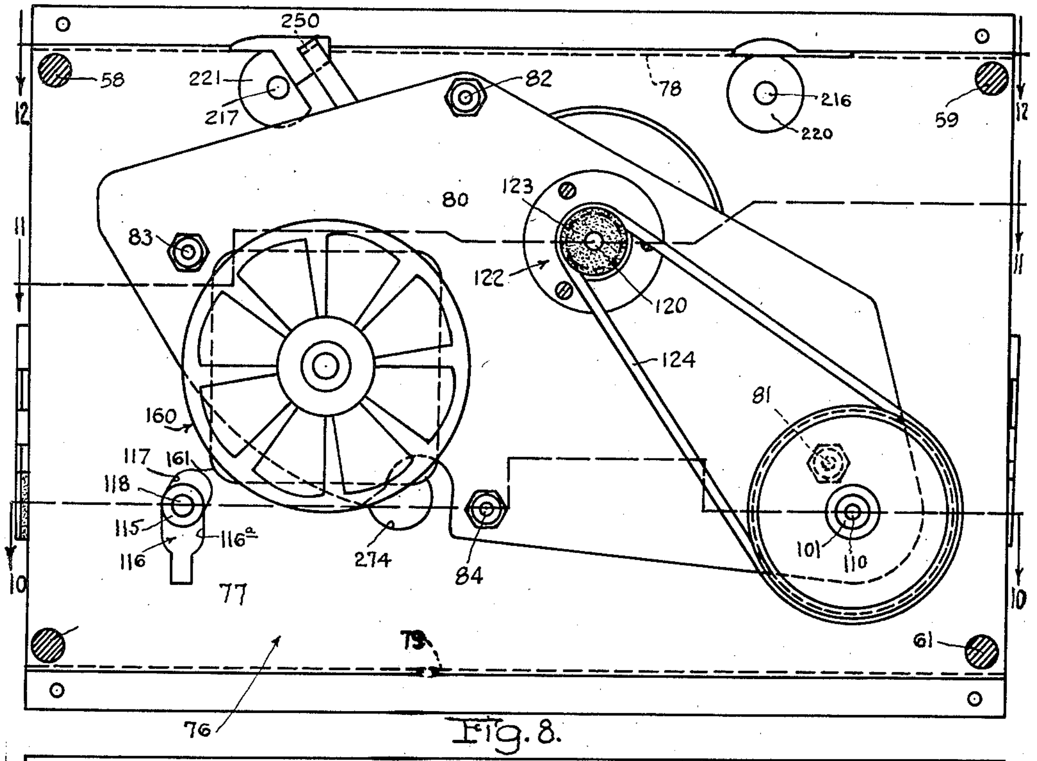
Figure 9:
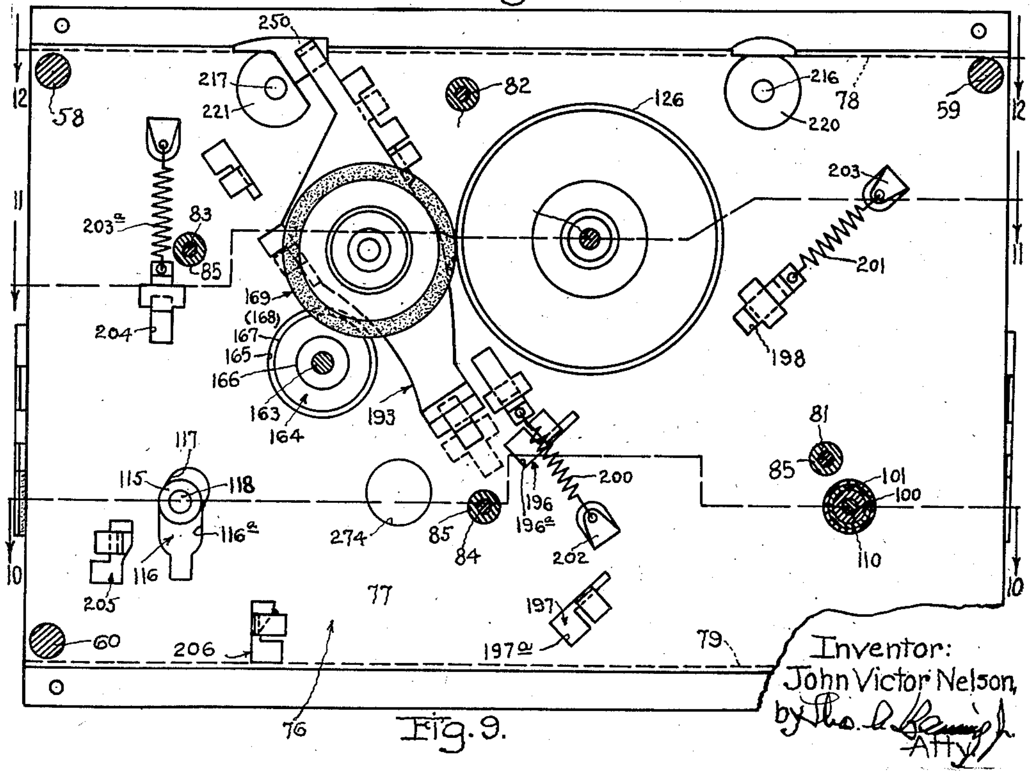
Figure 10:
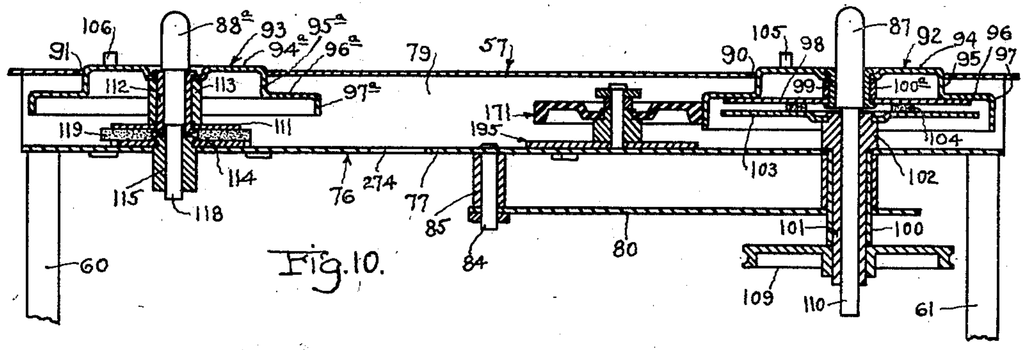
Figure 11:
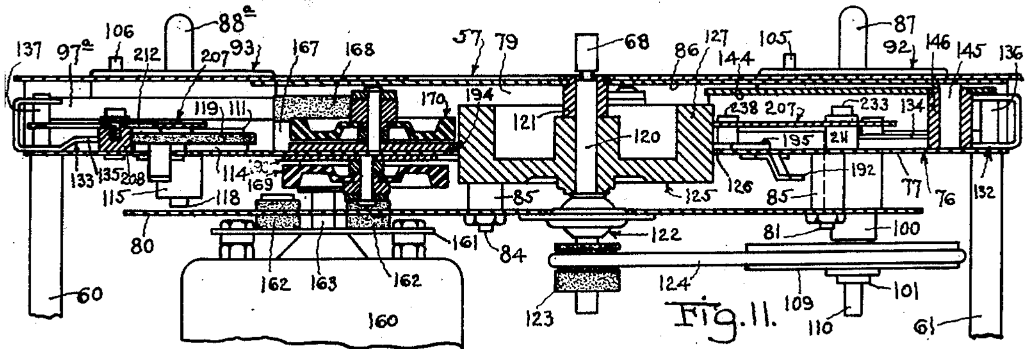
Figure 12:
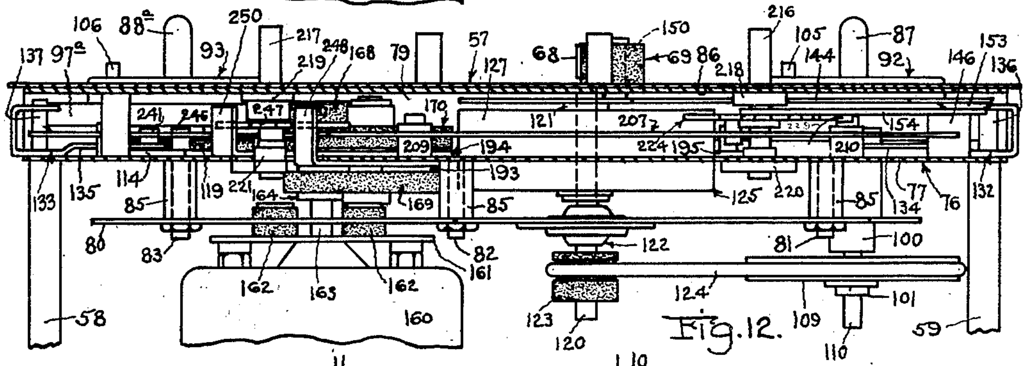
Figure 13:
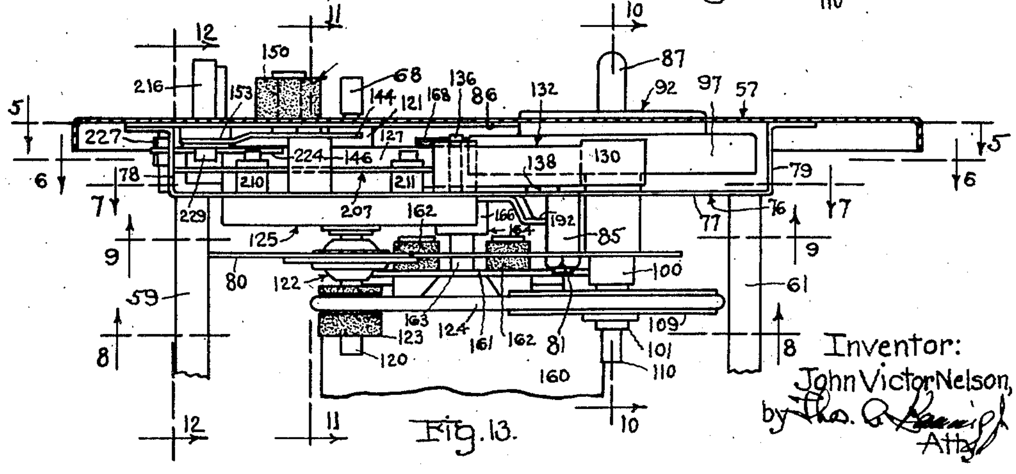
Figure 14:
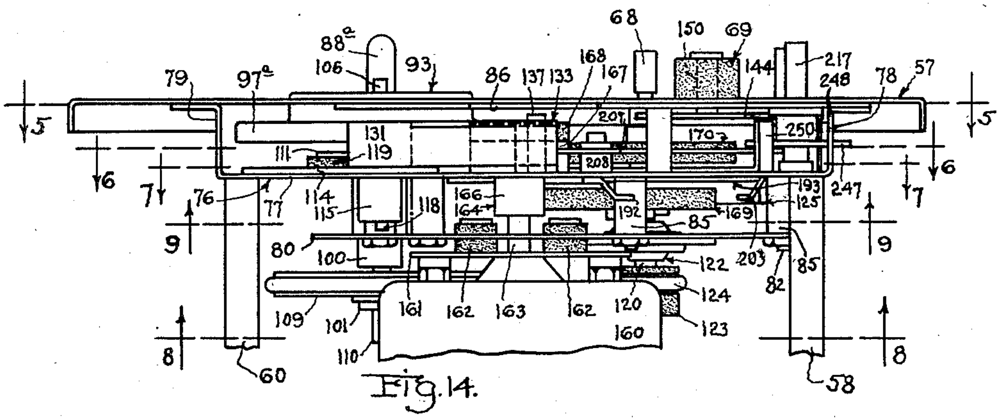
Figures 15, 16, 17, 18, 19, 20, 21, 22, 23, 24A:
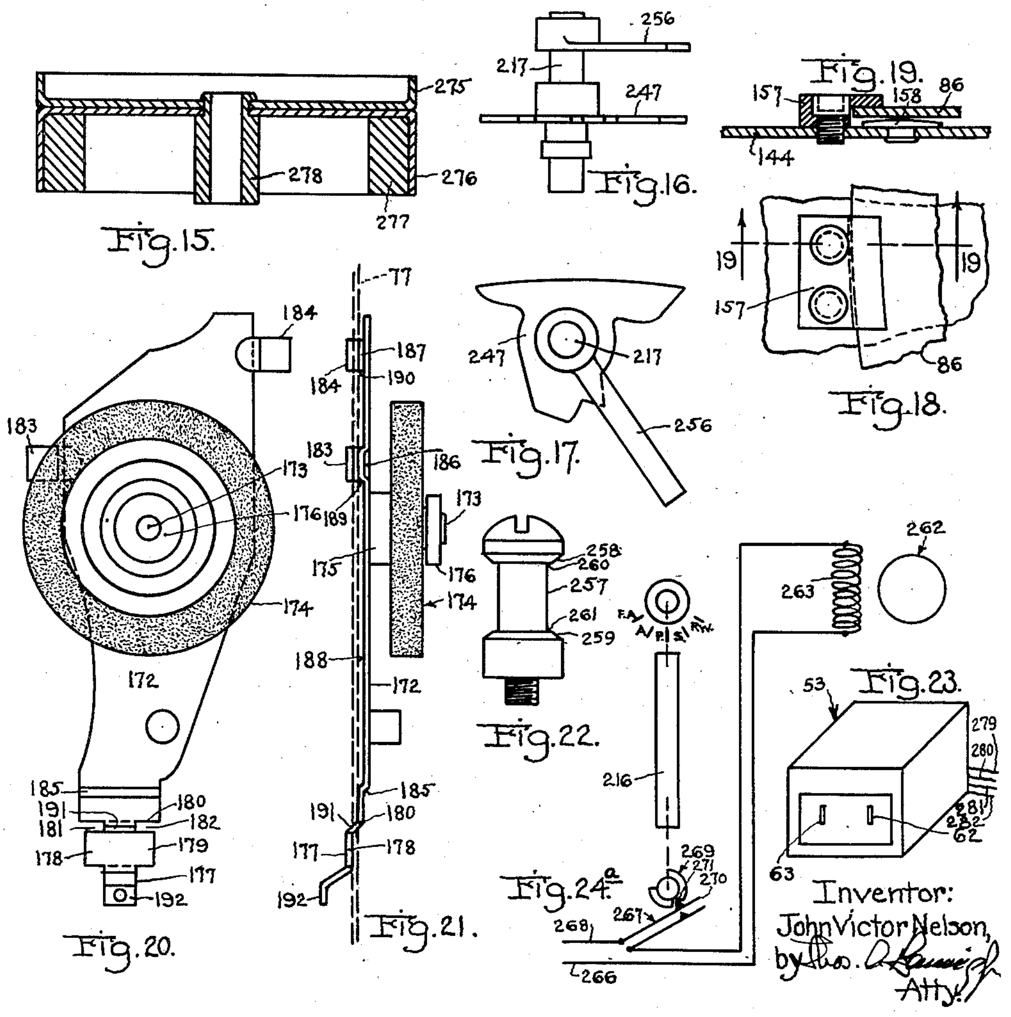
Figures 24, 25, 26, 27, 28, 29, 30, 31, 32, 33:
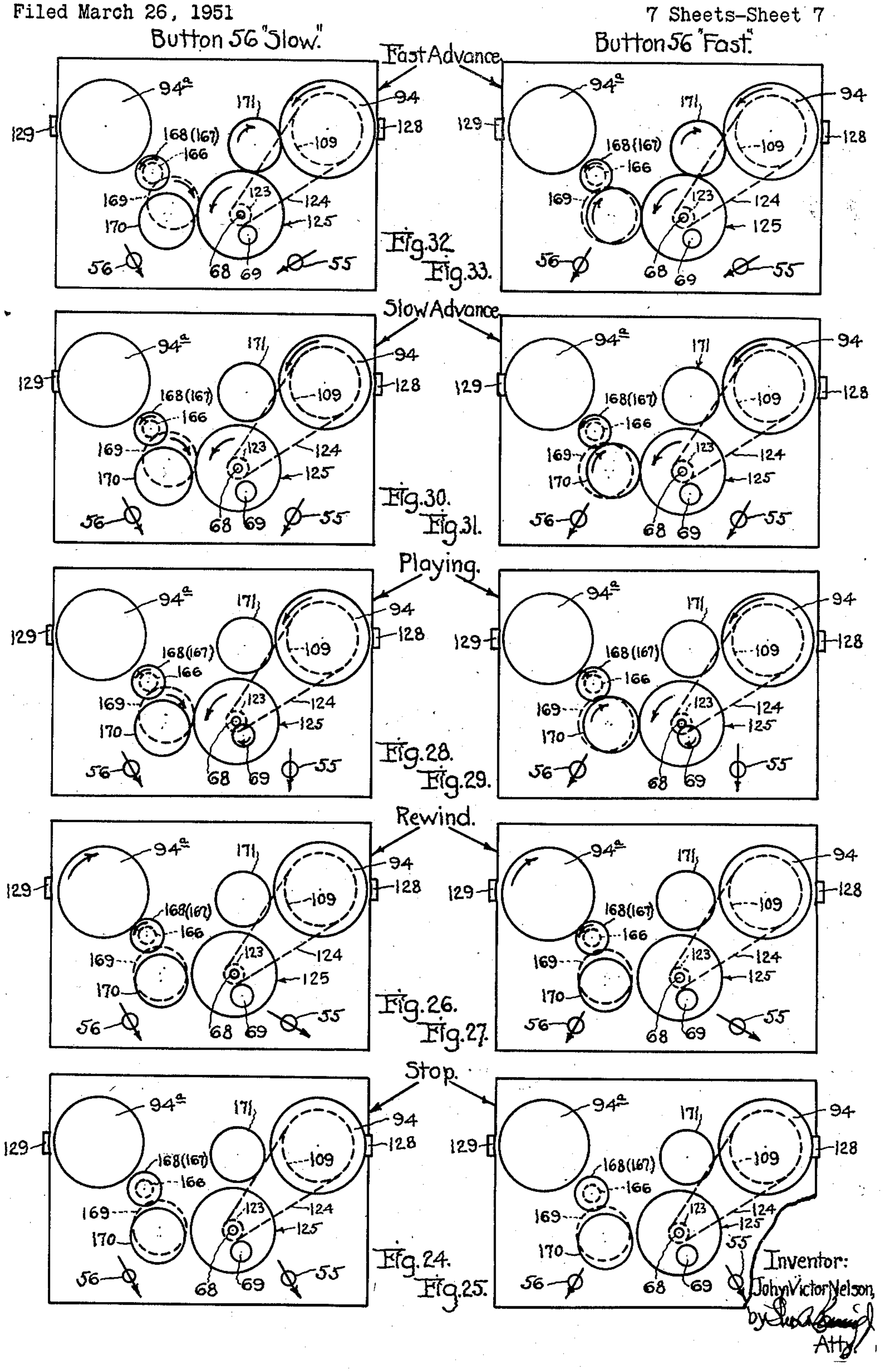

Figure 7 shows a plan view corresponding to Figures 5 and 6, but with the reciprocable shiftable cam plate removed in addition to the parts removed in previous figures; and is a horizontal section taken on the lines 7—7 of Figures 13 and 14, looking in the directions of the arrows;

Figure 8 shows a bottom view of the recorder, and may be considered as a horizontal section taken on the line 8—8 of Figures 13 and 14, looking upwardly in the directions of the arrows;

Figure 9 shows a horizontal section looking upwardly, and shows the bottom face of the floor of the compartment shown in Figures 5, 6 and 7; and is a horizontal section taken on the lines 9—9 of Figures 13 and 14, looking in the directions of the arrows;

Figure 10 shows a vertical section taken on the lines 10—10 of Figures 5, 6, 7, 8 and 9, looking in the directions of the arrows; and it shows particularly the constructions of the spindle mountings for the two reels;

Figure 11 shows a vertical section taken on the lines 11—11 of Figures 5, 6, 7, 8 and 9, looking in the directions of the arrows; and it shows particularly the constructions of the roller carrying slides, and the construction and journalling of the fly-wheel, etc.;

Figure 12 shows a vertical section taken on the lines 12—12 of Figures 5, 6, 7, 8 and 9, looking in the directions of the arrows; and it shows particularly the constructions of the control rock shaft elements;

Figure 13 shows a right-hand end elevation of the elements shown in Figures 5 to 12, inclusive;

Figure 14 shows a left-hand end elevation of the elements shown in Figures 5 to 12, inclusive;

Figure 15 shows a vertical detail section through a modified construction of the fly-wheel, the same being formed of cup shaped sheet metal sections secured together, and with an insert of suitable thickness to impart the desired rotational inertia to this form of fly-wheel;

Figure 16 shows a vertical detail elevation of the "Fast" and "Slow" rock control element, but of modified form in which said shaft is provided with an operating lever or finger piece instead of the finger button shown in other figures;

Figure 17 shows a plan view corresponding to Figure 16;

Figure 18 shows a fragmentary detail of the slide guide bracket carried by the bell-crank which also carries the presser roller and the tape guide, and which guide slide prevents downward deflection of said bell-crank and thus keeps the presser roller and the tape guide in correct elevational position;

Figure 19 shows a vertical section taken on the line 19—19 of Figure 18, looking in the direction of the arrows;

Figure 20 shows a plan view of a typical roller carrying slide plate;

Figure 21 shows an edge view corresponding to Figure 20, and it shows by dashed lines the plate of the recorder on which this slide operates, by dotted lines, so as to show the manner of engagement of the slide with such plate;

Figure 22 shows an elevational view of one of the tape guide studs which are located at the sides of the sensing head and tape guide elements;

Figure 23 shows a front elevation of a typical form of sensing head such as illustrated in other figures herein; and Figure 24ª shows schematically a simple form of electrical circuit for delivery of current to the drive motor, and this figure shows schematically the main control element rock shaft, and means to control the motor switch by the position of such main control element;

(Figures 5 to 14 are shown on approximately ⅔ scale, Figures 15, 16, 17, 20 and 21 are shown on approximately full scale, Figures 18 and 19 are shown on approximately one and one-half scale, Figure 22 is shown on approximately double scale, and Figure 23 is also shown on approximately double scale); and Figures 24 to 33, inclusive show schematically the principal elements of the present recorder in various operating and non-operating positions, and these figures show how the movements of the control rock shafts into their several positions effect changes in the positions of such elements as they control; and in these figures the following operating positions are indicated;

Figure 24, main control in "Off" position, supplemental control in "Slow" position;

Figure 25, same as Figure 24, but with supplemental control in "Fast" position;

Figure 26, main control in "Rewind" position, supplemental control in "Slow" position;

Figure 27, same as Figure 26, but with supplemental control in "Fast" position;

Figure 28, main control in "Playing" position, supplemental control in "Slow" position;

Figure 29, same as Figure 28, but with supplemental control in "Fast" position;

Figure 30, main control in "Slow Advance" position (non-playing), supplemental control in "Slow" position;

Figure 31, same as Figure 30, but with supplemental control in "Fast" position;

Figure 32, main control in "Faster Advance" position (non-playing), supplemental control in "Slow" position; and Figure 33, same as Figure 32, but with supplemental control in "Fast" position.

Referring first to Figures 1, 2, 3 and 4, the device therein shown includes the two reels 51 and 52, the sensing head 53, the tape guide 54, and the two control buttons 55 and 56. These elements are conveniently supported above the top plate 57 of the device, and for purposes of illustration the device is shown as being carried by the four posts 58, 59, 60 and 61. At this point I mention that I have not herein shown the details of such elements as electrical circuits used for amplifying and translating the electric signals, nor the speaker or other unit for translating the amplified signals into sound waves, since such elements are all well known in this and related arts, and since the present improvements may be used with many forms and details of such circuits and translating devices. I have, however, shown the sensing head 53 more or less schematically since this element is directly affected by the magnetic recordings carried by the tape whose movements are effected and controlled by the present improvements. In Figure 23 I have shown this sensing unit in front elevation, and on double scale, so that the magnetic poles which are related to the magnetizable material carried by the tape may be seen. These are the two pole pieces 62 and 63 each of which is a thin vertical element. These poles are separated somewhat from each other, and the pole 62 is influenced by the magnetic charges carried by the travelling tape, and thus the flux of this pole is continually influenced by the intensity of the magnetic record which is being translated; or conversely, in case the device is to be used for making a recording of signals received from a sound translating element, such as a megaphone, this pole is continually changed in its intensity, and correspondingly the flux delivered by this pole serves to effect a recording on the tape travelling past such pole. In other words, the improvements herein disclosed may be used either for translating signals previously recorded on the tape, or said improvements may be used for recording the signals on a blank tape for translation at a later time, either in this or some other recorder. The pole 63 of this sensing head may be energized electrically from a suitable source of current to produce a relatively strong flux from said pole; and when the tape is passed in front of such constantly magnetized pole any signals previously recorded on the tape and carried thereby will be "erased" according to well understood principles. Thus the tape may be "cleared" preparatory to receiving a new set of signals, if desired.

The unit herein may be conveniently mounted in a suitable case or housing, which housing will also carry the needed electrical elements and the speaker, the electrical circuits, the megaphone, and various elements required according to the details of the particular complete recording and translating unit with which my present improvements are to be used. I do not herein show any such housing since it is not needed for a proper understanding of my present improvements.

Generally the right-hand reel 51 will be the "Receiving" reel, to which the tape is delivered during translating operations, and the reel 52 will be the "Delivering" reel, from which the tape is delivered for translation. During normal translating operations the reel 51 is to be driven counterclockwise as shown by the arrow in Figure 1, during which operation the tape will travel from left to right past the sensing head, and from the reel 52 which reel 52 will also rotate counterclockwise during such operations. During this travel the amount of tape on the reel 51 will increase, with corresponding increase of the effective diameter of windings on said reel; and during this operation the amount of tape on the reel 52 will correspondingly decrease, with corresponding decrease of the effective diameter of windings on said reel. By providing means to cause tape travel at uniform rate past the sensing head it is evident that the rotational speed of the reel 51 will continually decrease, and the rotational speed of the reel 52 will continually increase, during normal translating operation.

As will presently appear, I have herein provided means to reverse the operation, driving the reel 52 in clockwise direction, without drive of the reel 51, and during such operation the tape will travel from right to left past the sensing head for rewinding purposes. At such times the electrical connections to the sensing head are generally made ineffective so that the re-winding will occur without translation.

Figure 3:
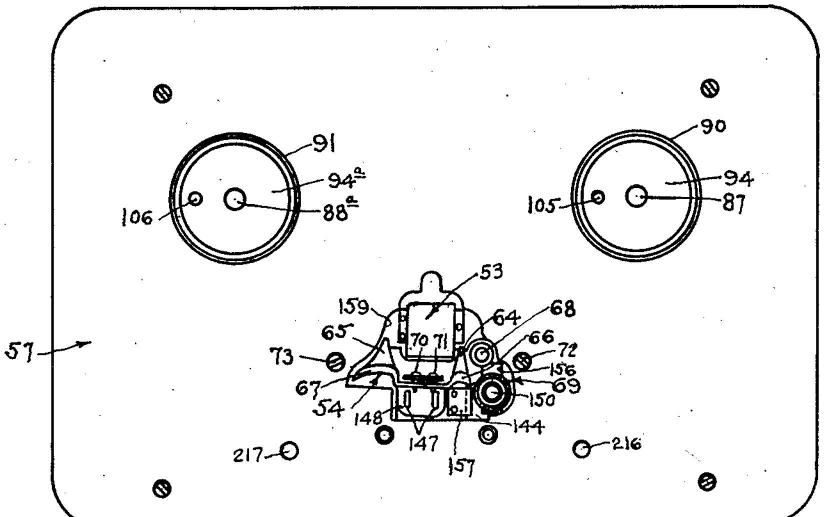
Figure 3 shows a plan view of the recorder with both of the reels removed from their spindles, and with both of the shields for the tape guide and for the sensing head removed.
Figure 2:
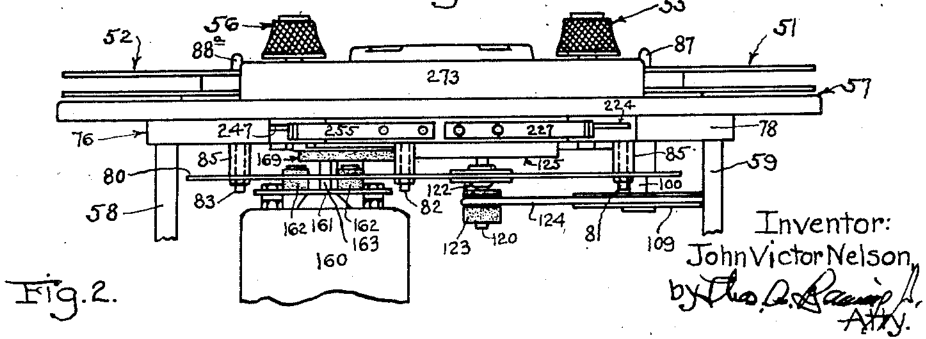
Figure 2 shows a front elevation corresponding to Figure 1.
Figure 4:
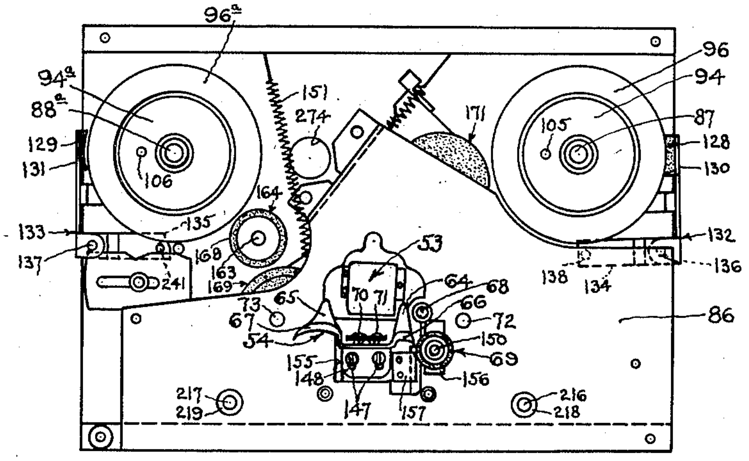
Figure 4 shows a plan view of the recorder with the top plate removed, but with the upper supporting plate in position, and with the sensing head and the tape guide in place.

The tape guide shown in Figures 3 and 4 includes the two rearwardly extending prongs 64 and 65 over which the lower edge of the tape travels; and also includes the channel shaped guide elements 66 and 67 within which the tape travels. There is provided the vertical axis spindle 68 which rotates on a fixed position axis slightly to the right of the sensing head; and the rotational direction of this spindle is counterclockwise so that tape pressed against the forward face of this spindle will be driven towards the right. A presser roller 69 is provided in advance of this spindle. This presser roller is not independently driven but when it is shifted rearwardly it engages the forward face of the tape directly in front of the spindle, thus bringing the tape into firm driving engagement with the spindle. Under such conditions the tape will be driven by the spindle towards the right at a speed determined by the rotational speed of such spindle. Shift of the presser roller towards the front of the device (towards the observer in figures) will terminate such driving engagement between the tape and the spindle so that the tape can be moved independently of the spindle rotations. This spindle is thus driven counterclockwise, and never need be driven clockwise during tape travels.

Figure 1:
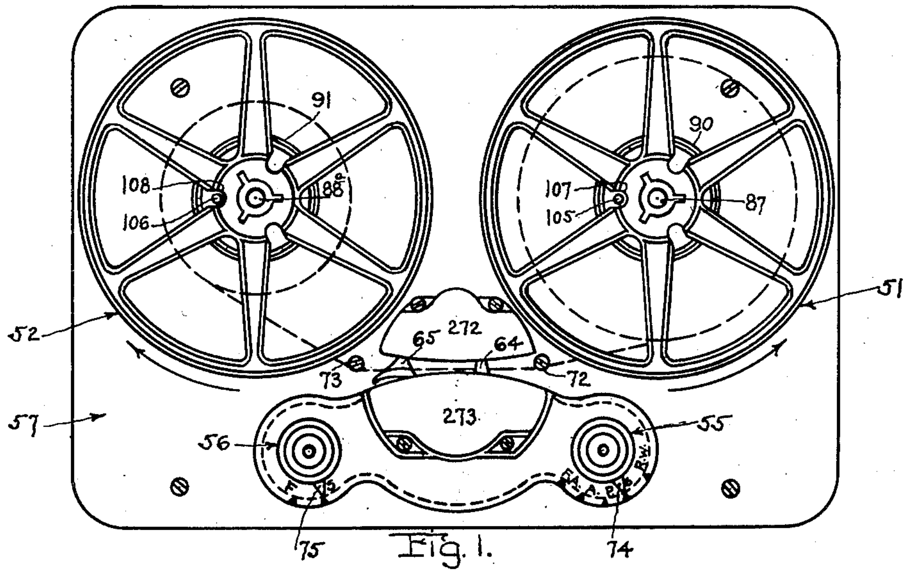
Figure 1 shows a plan view of a recorder embodying the features of the present invention, both of the control elements being shown in their "Stop" positions, and with the "Fast" and "Slow" control in its "Slow" position.

Both the tape guide and the presser roller are mounted upon and carried by a carrier which may be drawn towards the front of the device (towards the observer) to thus carry the presser roller away from its working position, and to provide a space between said roller and the spindle, and also to carry the tape guide away from the sensing head to thus provide a space between said tape guide and sensing head elements. In Figures 1, 3 and 4 the parts are shown in their "Stop" position in which position the tape guide and the presser roller are in their forward or non-operative positions. Thus, when the device is controlled to its "Stop" position the tape guide and the presser roller are both moved away from the sensing head and from the spindle, respectively, to provide spaces into which the tape may be inserted or removed in order to either thread the tape preparatory to a recording operation, or to allow for removal of the tape from the device. It will be seen from examination of Figures 1, 2 and 4 that when the parts are in this position, the prongs 64 and 65 are nevertheless in position to support the lower edge of the tape, thus ensuring correct placement of the tape during threading, or to ensure support of the tape after the control has been moved to its "Stop" position and until the tape can be removed from the device.

The tape guide also includes the two somewhat soft beads 70 and 71 which are spring pressed rearwardly (towards the sensing head). This arrangement is such that when the tape guide is moved rearwardly towards the sensing head these beads will press against the front face of the tape at locations opposite to the magnetic poles 62 and 63 to thus ensure good but smooth engagement of the rear (magnetizable) surface of the tape with said pole pieces 62 and 63, respectively. These features constitute the elements of said other application for patent herein already referred to.

Located at the right and left sides of the elements 68 and 69, and the tape guide, are the vertical posts or studs 72 and 73, respectively. These are preferably so formed as to provide good guides over which the tape must pass during its delivery to or from the reel 51 and to or from the reel 52, respectively. These studs are so located that the tape in passing over them when the presser roller and the tape guide 54 are in their forward positions will travel slightly in advance of the sensing head. That is, under these conditions the tape will not be in contact with the sensing head. However, when the tape guide and the presser roller are shifted rearwardly into operating positions the tape will be deflected slightly rearwardly to bring it into engagement with the sensing head and against the spindle, respectively. This relating of the parts ensures very convenient threading of the tape into position when the tape guide and the presser roller are in their forward or retracted positions.

The control buttons are connected to elements which perform various control functions. The button 55 may be rocked into either of five positions as shown in Figure 1, a pointer 74 on said button indicating the position to which said button has been moved. These positions are as follows; "R. W." (for rewind), "S" (for stop), "P" (for play), "A" (for advance), and "F. A." (for faster advance). The button 56 may be rocked into either of two positions as shown in Figure 1, a pointer 75 on said button indicating the position to which said button has been moved. These positions are as follows; "S" (for slow), and "F" (for fast). These two buttons are independently movable to their several positions, so that two control conditions or sets of conditions are thus possible. Detailed description of the present device will hereinafter show that the following various conditions of operation may be effected:

1. With the button 55 in position "S" no drive is effected to either reel, and the tape guide and the presser roller are in forward (non-operating) position. Conveniently, also, provision may be made for cutting off current from the driving motor when the button 55 is in this position. With said button in this position the button 56 may be moved to either of its positions without effect in either position. With button 55 in the "S" position reel 51 is braked.

2. By moving the button 55 to the "R. W." position the reel 52 is driven at fast rate in the clockwise direction for fast rewind. Under these conditions no drive is effected to the reel 51 which is thus free to rotate clockwise for delivery of tape leftwardly, and during this condition both the presser roller and the tape guide are in their forward or released positions. Thus, during rewind at fast rate the tape is not in contact with the sensing head. However, during this operation the reel 51 is subject to normal frictional resistance to rotation. With the button 55 in its "R. W." position the button 56 may be moved to either of its positions but without exerting control over the rate of rewinding.

3. By moving the button 55 to the "P" position the reel 51 is driven counterclockwise for travel of the tape towards the right from the reel 52 to the reel 51. With said button 55 in this "P" position both the tape guide and the presser roller are shifted rearwardly to bring the tape into translating position against the sensing head, and to ensure driving engagement of the tape with the spindle. Under these conditions said spindle is also driven counterclockwise for tape feed towards the right. The rate of drive of the spindle will then be determined by the position of the button 56, either slow or fast according to the position "S" or "F" of said button. During these operations both of the reel brakes are released, but both of said reels are subject to frictional resistance during drive.

4. By moving the button 55 to the "A" position the reel 51 is driven counterclockwise but both the tape guide and the presser roller are in their forward or non-operative positions. Also the brake is set on the reel 52 thus imposing a brake drag on said reel. The amount of this drag may be made such that although such drag serves to retain the tape in good taut condition the drive to the reel 51 may be sufficiently strong to overcome such drag and thus to ensure forward advance of the tape, but without translation to the sensing head. Such forward advance may serve to bring a desired portion of the tape record into sensing position rapidly, and without need of "playing" all of the recording contained on the tape thus advanced past the sensing head. The rate of such forward advance may be controlled by the button 56 for either "S" (slow) or "F" (faster). This "faster" advance is effected by use of the elements normally used for drive of the reel 51, as will presently appear.

5. By moving the button 55 to the "F. A." position the reel 51 is driven counterclockwise but with both the tape guide and the presser roller in their forward or non-operative positions. In this position the brake for the reel 52 is released so that it exerts no drag against tape advance. With the button 55 in this position the drive to the reel 51 is effected through a special intermediate friction drive roller or idler, and not through the friction drive to said reel 51 which is normally used. Under these conditions the rate of drive of the reel 51 may be made greater than any previously mentioned operating condition, even with the button 56 in its "S" or slow position. Then, by shifting said button 56 to its "F" or faster position the rate of rotation of the reel 51 may be still further increased so as to enable very fast tape advance. All such advancements of the tape with the button 55 in its "F. A." position will be effected while the tape guide and the presser roller are in retracted or forward, inoperative positions.

It is thus evident that I have made provision for either of two "playing" speeds, for several rates of tape advance without "playing," for rewinding the tape, and for stopping all operations, depending on the several positions to which the buttons 55 and 56 are set. I shall now describe the means whereby these several operations are effected:

Conveniently the main operative parts are accommodated within a chassis so that said parts may be readily assembled and adjusted into operative condition prior to insertion of such chassis within the recorder housing. This chassis includes the channel section 76 having the floor 77 and the front and back flanges 78 and 79. This chassis is provided with the corner posts 58, 59, 60 and 61 which may be set onto suitable supporting means of the housing (not illustrated). A plate 80 depends from the floor of this channel, being secured to the channel by the four posts 81, 82, 83 and 84, and accurately spaced from the channel floor by the sleeves 85 located on said posts. A plate 86 is set onto the upper faces of the channel flanges 78 and 79, being secured thereto conveniently. This plate 86 serves to support various of the operating elements.

The two reels 51 and 52 are provided with center holes according to conventional practice, and the chassis is provided with the vertical posts 87 and 88ᵃ which extend up beyond the plane of the plate 86 and onto which these reels may be set and centered. A top plate 57 is located just above the plate 86 and is preferably of larger size than the chassis, overhanging the channel element 76 both at front and back, and at both sides. This top plate may be secured directly to the channel flanges or to elements carried thereby. This top plate is provided with openings 90 and 91 concentric with the two centering posts 87 and 88ᵃ, such openings being of considerable size as shown in Figure 3, for example. The inverted cup-shaped elements 92 and 93 are provided for the two reels and for the posts 87 and 88ᵃ. The forms of these cup elements are well shown in section in Figure 10. The element 87 includes the upper smaller cup portion 94 from the lower portion of which there extends outwardly the cylindrical flange 95, and from the lower portion of this cylindrical flange there extends the outwardly extending flange 96 of larger diameter than the opening 90; and from the outer edge of this flange 96 there extends downwardly the cylindrical flange 97. The cup element 88ᵃ is of similar form to that of the element 87, just described, and its elements are similarly numbered, but with the suffixes *a* thereon. It is here noted, however, that the flange 97ᵃ of the element 88ᵃ is of less vertical dimension than the corresponding flange 97 of the element 87 for reasons which will presently appear.

The element 87 is provided with the inside plate 98 which is secured to the top portion 94 of the element 87 by the short sleeve 99 whose upper and lower ends are riveted in place as shown in Figure 10. Thus said plate is rigidly secured to the element proper. A sleeve 100 extends down through the floor of the channel and through the plate 80. This sleeve is secured to the plate 80 or to the channel floor and constitutes a journal bearing. Another sleeve 101 is journalled within said sleeve 100 and reaches to a lower position than the lower end of the sleeve 100. Preferably the upper end of this sleeve 101 is enlarged as shown at 102 to provide a downwardly facing shoulder which rests on the floor or on the upper end of the sleeve 100 to provide in effect a thrust bearing to carry the load imposed from above. A circular plate 103 is riveted to the upper end of this enlarged end 102 and underlies the plate 98 of the element 87; but a circular band or ring of suitable friction material, such as felt, 104 is secured to the under face of the plate 98. This band rests on the upper face of the plate 103 and the load imposed by the weight of the element 87, together with the reel 51 and its contained tape (or wire) is transmitted to the plate 103 through the medium of this friction band or element 104. Thus there may be transmitted between the element 87 and the sleeve 101 a torque depending in amount on the friction of the band 104 against the plate 103 as determined by the weight load thus supported. By driving the lower end of the sleeve 101 the element 87 may be driven, but with a limit of torque as allowed by this friction drive. Or, contrarily, when the sleeve 101 is retained against rotation, the reel may nevertheless be rotated, with rotation of the element 87, by producing a torque sufficient to overcome such friction drive.

It is here noted that the studs 105 and 106 extend up from the top faces 94 and 94ª of the elements 87 and 88, and the reels 51 and 52 are provided with corresponding notches or engageable portions, 107 and 108 so that drive is effected between the elements 87 and 88, and the reels 51 and 52, respectively. However, this arrangement permits ready placement or removal of the reels with respect to the elements 87 and 88, as required.

The lower portion of the sleeve 101 has secured to it the pulley 109 by which said sleeve may be driven to effect drive of the element 87 (and the reel 51) through the friction drive above described. However, under certain conditions the element 87 may be directly driven without interposition of such friction drive, and even to overcome the friction of such drive; such special drive directly to the element 87 being effected by drive to the flange portion 97 of such element. This will presently appear in detail.

The stud 87 is provided with a downward extension 110 which reaches through the sleeve 101 but the sleeve is free to rotate with respect to such extension.

The element 93 has secured to its top portion 94ª in rigid fashion the circular plate 111. This securing is effected by means of the tubular rivet 112 whose upper and lower ends are riveted against the top portion 94ª, and the bottom face of the plate 111, respectively; and the spacer collar 113 is located on said tubular rivet and between the upper portion 94ª and the plate 111, respectively. Thus the element 93 and the plate 111 are rigidly connected together but in proper spacing. The stud 88ª is set down into the rivet element 112, and is shouldered as shown in Figure 10 to limit such downward movement.

At this point I mentioned that the reel 52 carried by the element 88 is normally the "Delivery" reel from which tape is drawn during translation operations, at which times this reel is subjected to a frictional resistance as already explained. However, during "Rewind" this reel is to be driven in opposite direction. To effect these several results the element 88 is so journalled that normally it rotates on a fixed vertical axis; but when rewind is to be effected this axis is shifted slightly to bring said element 88 into driving engagement with the drive for such rewind. Accordingly, I have provided the plate 114 which sets onto the floor 77 of the channel, and may be shifted slightly back and forth on said floor, as will presently appear. Also, this plate 114 conveniently comprises one of the "slide" plates or brackets presently to be described in detail; but at this point I mention the movability of such plate 114 for the reason already explained.

A hub element 115 is riveted to the plate 114. Said hub element extends down through an opening in the floor 77; and as shown in Figure 7 and 9, this opening 116 is formed with a slanting portion 117 so that movement of the hub along the opening (during change from one operating condition to another) will cause lateral movement of the hub, or movement in such special direction as needed, as will presently appear. The stud 88ª is provided with a downward extension 118 which extends into the hub 115, and may be secured to the hub as by a set screw or otherwise. Thus said stud is rigidly connected to and carried by the plate 114 whose position is in turn controlled by the form of the slotted opening 116—117. Thus, too, the element 88 and the reel carried thereby are controlled as to position by the form of such slotted opening.

The plate 114 has its top face provided with a suitable friction surface such as the felt ring 119, and the plate 111 which is riveted to the element 88 rests on and is carried by such friction surface element. Since the plate 114 cannot rotate, the friction surface or lining is also retained against rotation, and thus the rotation of the reel, together with the element 88 and the plate 111 must result in development of a frictional resistance in the form of a torque resisting rotation of the reel. The extent of this resistance will depend among other things on the weight imposed against the friction element by the plate 111, such weight being due to the weight of the element 88, the reel, and the tape or wire contained on the reel. Normally this reel is the "Delivery" reel from which tape is drawn to feed past the sensing head and to the "Receiving" reel and during such normal operations the frictional resistance thus developed will ensure that the tape will be retained taut and in good form as it passes the sensing head. However, during "Rewind" the reel 52 and element 88 must be rotated reversely. Means are provided for effecting such reverse rotation and for overcoming the frictional resistance imposed by the constructions already disclosed.

The spindle 68 comprises the upper end portion of the shaft 120 (best shown in Figure 11). A bearing element 121 is extended through the plate 86, being conveniently riveted thereto as shown in Figure 11, and the shaft 120 is journalled in this bearing. Another self centering and aligning bearing element 122 is carried by the plate 80, the shaft extending through this bearing 122 also, and on down to a position below said plate 80. To such lower end portion of the shaft there is connected or carried a pinion element 123, preferably of rubber, and grooved to receive a suitable driving belt or the like, 124. This pinion is aligned with the pulley 109, so that during rotation of the shaft 120 (and the spindle 68), drive is effected to the pulley 109 and thus to the plate 103 which carries the ring shaped friction element 104. Thus, during spindle drive there is developed a frictional drive to the element 87 which carries the reel 51, but slip can occur whenever needed by overcoming the amount of torque developed by this friction drive.

During "playing" the tape is delivered towards the right at a rate proportionate to the rate of spindle rotation. The driving engagement of the tape against the spindle is at all times great enough to ensure that control of tape movement shall be under the jurisdiction of this spindle, regardless of take-off pull being exerted by the reel 87 during such operation. I have already mentioned the presser roller 69 by which the tape is brought and pressed against the spindle, and this roller is, at proper times, pressed towards the spindle under a sufficiently large spring force to ensure the foregoing result.

The parts are so proportioned that the rotational rate of the pulley 109, and the plate 103, are high enough, with respect to the corresponding rotational rate of the spindle, to require that slip shall occur between the said plate 103 and the element 87, even when the reel is practically completely empty of tape (or wire), under which conditions the effective diameter of such reel will be least. Then, as tape is wound onto such reel during translation or otherwise, the effective diameter of such reel will increase, with corresponding increase in the rate of slip.

It may here be noted that for a given weight of the reel (and the element 87) there is developed a basic amount of torque due to this friction drive; and the pull which will be exerted on the tape will be proportionate to such torque and inversely proportionate to the effective diameter of the reel. As the amount of tape wound on the reel increases the weight increases, thus increasing the friction drive effect and torque; but at the same time the effective diameter increases so that as a result there is a tendency to produce a balance between increase of torque and increase of effective diameter, with corresponding tendency to reduce the otherwise large increase in tape pull which would thus occur. As a matter of fact the increase in weight will be more or less according to the square of the increase in effective diameter, so that there will be some increase in pull. However, the spindle serves at all times to exert complete control over the rate of tape movement.

The shaft 120 carries a flywheel 125 between the bearings 121 and 122. This flywheel is thus located between the plates 86 and 80, and an opening 126 is provided in the floor 77 of the channel element to accommodate the flywheel, which is of axial dimension to extend both above and below such floor. Thus the flange 127 of such flywheel is exposed at locations both above and below such floor. At this point I mention that drive is always effected to such flywheel during all operations except during rewind, so that drive is effected to the spindle and to the plate 103 during all operating conditions except rewind. Also, under certain operating conditions included in the foregoing operations the drive to the element 87 is effected through the medium of the friction drive already discussed, but under certain other operating conditions the drive from the flywheel to the element 87 is effected without use of such friction drive, and by shunting the same. This will presently appear.

Provision is made for directly braking either of the elements 87 or 88 for reasons already explained. Such braking actions are effected by engagement of braking shoes against the flanges 97 and 97a of the elements 87 and 88, respectively. In Figures 5, 6 and 7 these shoes are well shown, and they also appear in other figures. These are the brake shoes 128 and 129 for the elements 87 and 88, respectively. Conveniently these shoes are made of compacted felt or the like, cemented or otherwise secured to the free ends 130 and 131 of bell-cranks 132 and 133. Each of these bell-cranks includes the arm to which the shoe is cemented, and also another arm, 134 or 135, as the case may be, which lies rather close to the floor 77 and reaches inwardly a distance sufficient to exert a control on such arm, as will presently appear. The elbows of these bell-cranks are journalled on the studs 136 and 137 which extend upwardly from the floor 77 a sufficient distance, as well shown in Figures 11 and 12, and elsewhere. The shoe carrying arms of these bell-cranks are provided with lugs 138 and 139 which also lie close to the floor 77 and extend inwardly some distance, as well shown in Figures 6 and 7, and elsewhere. Tension springs 140 and 141 are connected to these lugs and are anchored to studs 142 and 143 extending upwardly somewhat from the floor 77. Thus there is at all times developed a spring force urging both of the brakes to their set or braking positions; and such braking forces are of such magnitude as may be needed to ensure good braking operation according to the principles herein set forth.

Means are provided for forcing these brakes to their inoperative or non-braked positions at proper times, as will hereinafter appear. It is here to be noted that in the case of the reel 52 both the brake shoes 129 and the friction drag of the plate 111 against the element 119 produce a cumulative braking effect when said brake shoe 129 is set. That is, when said brake shoe is set its braking effect is added to the braking or dragging effect constantly being exerted by the element 119. This brake for the element 88 (and reel 52) is to be used or set when need be to restrain and control the parts after a fast "Advancing" operation, in which the tape has been run towards the right at a fast rate and is to be suddenly slowed or stopped. In such case the braking of the element 88 and reel 52 will prevent over-running of such reel, with corresponding excessive delivery of tape faster than required by the reel 51 (which, in such an operation may have been actually stopped quickly).

In case of a sudden or rapid decrease of rate of tape travel towards the left a different set of conditions is seen to exist. In this case the braking should be effected on the right hand reel 51, and its element 87, without special braking of the element 88 for the reel 52, so as to ensure that the tape shall be retained under tension, and without over-run. Such a fast travel of the tape towards the left would have been occurring during a rewind, under which conditions tape would be drawn from the reel 51 rotating clockwise at possibly high speed. Upon suddenly reducing the speed of the reel 52, or even stopping said reel, by the friction developed by the elements 111—119, there might be a serious over-running of the reel 51, with corresponding improper delivery of tape after the drawing effect of the reel 52 had ceased. Such over-running tendency of the reel 51 would be somewhat lessened by the frictional engagement of the plate 98 with the friction surface 104, provided that the rotational rate of the reel 51 and element 87 had been greater than the rotational rate of the pulley 109. During rewind the pulley 109 is stationary, drive being effected directly to the elements 88 as will presently appear, so there will be a continuous frictional drag or resistance to reel rotation during such rewind, and at sudden termination or slowing of such rewind this resistance at the element 87 will tend to retain the tape taut. However, experience has shown that even under these conditions it is desirable to provide for the special braking action; and the setting of the brake 128 effects this result.

A bell-crank 144 is pivoted to a post 145 which is secured to the floor 77. Such pivoting is effected by securing a sleeve 146 to the bell-crank at its knee, and then journalling such sleeve on the post. This sleeve thus also serves to retain the bell-crank at the proper elevation above the floor 77. The left-hand or free end of this bell-crank rocks back and forth between the fly-wheel shaft (and spindle) position, and the front flange of the channel, 78; and said bell-crank is located and rocks in a plane near the upper portion of the channel, and slightly below the plate 86. The tape guide 54 is secured to this bell-crank by screws extended through slots 147 in the flange 148 of the tape-guide element, such screws threading into the holes 149 of the bell-crank. The presser roller 69 is journalled on a stud 150 extending up from the bell-crank at a position such as to ensure proper co-operation between such presser roller and the spindle. This presser roller comprises a cylindrical body element carrying a rubber or like surfacing so as to give firm but slightly yieldable pressing contact against the tape when the presser roller is in its operative position.

The bell-crank is to be rocked back and forth to carry the tape guide and the presser roller into and out of operative positions. A tension spring 151 has one end anchored to the rear flange 79 and its free end connected to the ear 152 on the left-hand end of the bell-crank. This spring thus constantly urges the bell-crank rearwardly, tending to carry the tape guide and the presser roller into operative positions. The bell-crank includes the short, forwardly extending arm 153 which is depressed slightly below the plane within which the main arm of the bell-crank rocks. A link 154 has its right-hand end pivoted to the front end of the short arm 153, said link extending leftwardly at a location close to the front flange 78 of the channel. Means, presently to be disclosed, are provided for urging this link rightward when the tape guide and the presser roller are to be shifted forward, such rightward link movement being against the urging of the spring 151.

The plate 86 carries the sensing head, as shown in Figure 4, among others. The tape guide extends upwardly through an opening 155 in the plate 86, and the presser roller extends upwardly through a slot 156 in said plate 86, or as shown, the stud on which said roller is journalled extends through said slot, with the roller proper located above the elevation of the plate 86. Both the opening 155 and the slot 156 are of such shape and size as to accommodate the necessary movements executed by the back and forth movements of the tape guide and the presser roller. In order to support the left hand end portion of the bell-crank against depression, and to thus assist in maintaining good alignment of the tape guide with the sensing head, and the presser roller with the spindle, I have shown the small block 157 secured to the top face of the bell-crank and overlying the left hand edge of the plate 86 at the opening 155, the right-hand edge of such block being undercut to enable such overlie. This detail is well shown in Figures 18 and 19. To ensure smooth back and forth rock of the bell-crank, and to further control possible slight up and down deflections of said element, I have shown the anti-friction metal, relatively large head rivets 158 secured to the bell-crank near the location of the presser roller and said block 157. These rivets will ride against the under face of the plate 86 in case of slight rise of the bell-crank, thus limiting such rise and effecting control of the bell-crank upwardly.

The top plate 89 is provided with a relatively large opening 159 to accommodate the sensing head, the spindle, the tape guide, and the presser roller, since all of these elements extend upwardly from beneath the level of such top plate 89.

A vertical shaft drive motor 160 is located beneath the plate 80, and is secured to a rectangular plate 161. This plate 161 is in turn secured to the plate 80 by means of anti-vibration, rubber type washer elements, 162 of well known design. These anti-vibration elements serve to damp out motor vibrations and thus to ensure more faithful interpretation of the recorder operations.

The motor shaft 163 extends upwardly through the plates 161 and 80, and through the floor 77. A drive head 164 is secured to the upper end portion of this motor shaft, and extends through the floor 77. The opening in the floor 77 is shown at 165, and is of size to accommodate this drive head with suitable clearance, as shown in Figures 5, 6 and 7, in particular. The openings in the plates 161 and 80 are also of size sufficient to pass this drive head so that the motor and drive head as an assembly may be readily set into place as a unit.

This drive head includes three distinct driving surfaces. These are as follows: A small diameter surface 166 on its lower portion, such surface 166 being located just below the floor 77, and two surfaces 167 and 168 of larger diameter located above the floor 77, such surfaces of larger diameter being at different elevations. All of these surfaces are shown at least in part in Figure 14, and some of them are shown also in other figures. Examination of Figure 11 in particular shows that the upper surface 168 lies within the plane which also includes the flange 97a of the element 88 upon which the reel 52 is carried; and this fact is pertinent to the drive of said reel 52 in reverse direction for rewinding operations, as will presently become evident.

In order to effect the desired drives from the motor drive head 164 for various purposes the following driving combinations are to be made: From the small diameter surface 166 to the fly-wheel surface through the medium of an idler pulley; or, from the larger diameter surface 167 to the fly-wheel surface through the medium of an idler pulley; or, directly from the larger diameter surface 168 to the flange of the element 88. It will at once be seen that these combinations will produce either low speed rotation of the fly-wheel and the spindle, and correspondingly low speed drive of the element 87 for the reel 51 through the means of the belt and pulley drive, or higher speed rotation of the fly-wheel and the spindle, and correspondingly higher speed drive of the element 87 through the means of the belt and pulley drive, or high speed drive of the element 88 for the reel 52 by direct drive means. It will also be seen that for either such low speed or higher speed drive conditions to the fly-wheel and spindle the element 87 and reel 51 will be driven in the same rotational direction since these elements are connected together by the belt and pulley drive, and in each case the drive from the drive head 166 is effected through the medium of an idler. During these operations no drive is being made to the flange 97$^a$ of the element 88, since during these operations the shaft or stud 88$^a$—115 is not shifted laterally to bring said flange into engagement with the surface 168. However, as another operation, when the fly-wheel and spindle, and element 87 are not being driven, the stud 88$^a$—115 may be shifted slightly to bring the flange 97$^a$ into engagement with the drive surface 168 without interposition of an idler, so that under these conditions the element 88 and reel 52 will be driven in reverse direction and at higher speed, for rewinding operations.

As a further condition of operation for which provision has been made the following is here stated: The rate at which the pulley 109 may be driven is determined by the ratio of effective diameters of the pinion 123 and pulley 109, and as shown in the various figures this ratio is rather large. Accordingly the possible rate of rotation of the reel 51 with such drive is of limited value, even when there is no slip, an abnormal condition of operation. In order to make possible a faster rate of drive of the element 87 and reel 51, when driving from the fly-wheel, provision has been made for direct interposition of an idler between the fly-wheel and the flange 97 of the element 87, under which condition the friction drive is shunted, and the ratio of speeds of the fly-wheel and the element 87 becomes the ratio of fly-wheel diameter compared to diameter of the flange 97. This ratio is much greater than that existing between the pinion 123 and the pulley 109. It is here noted that this higher speed drive condition is effected by changing the ratio of drive from the fly-wheel to the flange or to the element 87, and in this case, also, the fly-wheel itself may be driven from either the smaller diameter surface 166 or the larger diameter surface 167 already referred to.

To effect the foregoing various drives the following means is provided:

An idler pulley 169 is provided (at the bottom side of the floor 77) which is normally set over into the position shown in Figure 9, for example. This idler can be shifted slightly in diagonal direction to effect drive from the small diameter surface 166 to the fly-wheel. Another idler pulley 170 is provided just above the floor 77 which is normally set over into the position shown in Figures 5, 6 and 7, for example. This idler can be shifted slightly in diagonal direction to effect drive from the larger diameter surface 167 to the fly-wheel. Another idler pulley 171 is provided just above the floor 77 which is normally set over into the position shown in Figures 5, 6 and 7, for example. This idler can be shifted slightly in diagonal direction to effect drive from the fly-wheel direct to the flange 97 of the element 87 for the reel 51. It has been stated that the stud 88 for the element 88$^a$, for the reel 52, can be shifted slightly. This stud and the corresponding parts are shown in normal position in Figures 6, 7 and 9, for example. By shifting this stud slightly in diagonal direction the flange 97$^a$ of the element 88 is brought into direct engagement with the larger diameter surface 168 for drive of the element 88 in reverse direction (there being no idler interposed), and at relatively high speed for rewind.

All of these idlers are preferably of rubber or are provided with rubber driving surfaces as indicated in the several figures. It is noted that both of the driving surfaces 166 and 167 of the drive element of the motor are indicated as being of metal, and also that the fly-wheel surface is also of metal. Thus, drive of the fly-wheel from either of said surfaces 166 or 167 is from metal to rubber to metal, bringing metal and rubber together in each instance. It is also noted that the higher surface 168 of the drive head of the motor is shown as rubber, so that when driving the element 88 by direct drive for rewind such drive is effected by rubber to metal engagement. It is also seen that the idler 171 is rubber surfaced, and it engages the metal surfaces of the fly-wheel and the flange 97 of the element 87. Thus there is also provided a metal to rubber to metal drive in this case also.

Each of the idlers 169, 170 and 171 is carried by a "slide plate" to which it is journalled and by the movement of which slide plate the idler's position is controlled. Such a typical slide plate is shown in approximately full scale in Figures 20 and 21. Description of this typical slide plate will be indicative of the constructions of the others, except as I may make special description thereof.

This slide plate 172 is elongated, and the stud 173 is secured to the approximate central portion of the plate, as by riveting. The wheel 174 is journalled on said stud, and the exact elevation or spacing of such wheel from the plate's surface may be determined by the washer or sleeve 175 interposed. Reference to Figure 11 shows two of these idler wheels in section. It will there be seen that each idler wheel includes a central flange portion lying within a plane close to one facial edge of the rim of the wheel, and also includes a circular flange portion connected to such central flange portion but offset so as to lie within a plane close to the other facial edge of the rim of the wheel. Therefore, by using a washer of selected size, and by setting the wheel onto the stud in one or the other condition (either with its central flange portion towards or away from the surface of the plate 172) it is possible to bring the driving peripheral surface of the wheel into either of two positions, either close to the surface of the plate or further therefrom as necessary to meet the requirements of the installation. For example, in Figure 10 the idler 171 between the fly-wheel and the flange 97 is shown upside down as compared to the idler 170 between the drive head surface 167 and the fly-wheel. The outer end of the stud is riveted or otherwise formed to retain the wheel in place thereon, preferably with interposition of another washer 176. Both of the washers 175 and 176 are preferably formed of fiber or the like.

At one end the typical slide is provided with an endwise extended lug 177 which is relatively narrow, and the two ears 178 and 179 project laterally from this lug. These ears are separated from the end 180 of the body of the plate to provide the notched openings 181 and 182. The typical slide is also provided with the laterally extending ears 183 and 184 near its opposite end and at opposite sides of the slide. Each of these ears is also of approximately the same projected size as the width of the lug 177. Examination of Figure 21 shows that near its end 180, and also near each of the ears the plate is slightly offset so that such offsets, 185, 186 and 187 may rest against a surface such as 188 (shown by dashed line in Figure 21), thus ensuring a three point support for the slide plate, and also reducing its frictional engagement with the surface 188 to a minimum amount. Each of the ears 183 and 184 then is deflected away from the plane of the plate 172 by an amount slightly more than the thickness of a floor or plate on which the slide is to work. These deflections are shown at 189 and 190 respectively, in Figure 21. They permit engagement of the lugs or ears with the back or opposite face of that plate on which the slide is slidably mounted. Likewise, the lug 177 is provided with the deflection 191 at the location of the notches 181 and 182 so that the lateral ears 178 and 179 may underlie the surface of that plate on which the slide is being supported. All of these ears serve to retain the slide in place on the plate whereon it operates, but prevent the slide from becoming disengaged from such plate unintentionally. Nevertheless the arrangement is such that, when desired, the slide may be readily set into or removed from its operative position on the carrier plate. This will presently appear. The lug 177 has its end portion further deflected outwardly from the plane of the slide to provide the ear portion 192 to which may be attached a tension spring.

A slide plate such as just typically described is proivded for each of the idler rollers 169, 170 and 171. These are the slides 193, 194 and 195, respectively. A similar slide comprises the plate 114 which carries the hub 115 for the stud 88ª onto which the reel 88 is placed. It is here noted that the slide 193 operates against the bottom face of the floor 77, whereas both of the slides 194 and 195 operate against the top face of said floor.

Suitable slotted openings are provided in the floor 77 to accommodate the various ears and lugs of these slides, so that said slides may be set into place, and so that when in place they will be retained against unintentional removal from the floor. These slots are also so formed that the slides may be readily inserted and removed with respect to the floor by special movements of the slides during such operations. For the slide 195 there are provided the three slotted openings 196, 197 and 198 for the ears 183 and 184, and for the lug 177 of said slide. Each of the openings 196 and 197 includes a broad portion 196ª or 197ª as the case may be which merges with an elongated narrower portion. The slotted opening 198 for the lug 177 is slightly longer than the width of the corresponding lug 177, measured over the ears 178 and 179 thereof. Such being the case it is possible to insert the said lug endwise through such slotted opening but with the slide rocked through ninety degrees from the plane of the floor plate, so as to move the ears to the opposite side of such floor plate. Thereafter the slide may be rotated back into position to cause the ears to extend outwardly at the sides of the slot, and the slide may at the same time be rocked downwardly into parallelism with respect to the floor plate, thus causing the ears to project outwardly or laterally at the two sides of the slot, and thus locking that end of the slide in place. Then, by shifting the slide endwise to bring its ears into registry with the laterally enlarged portions 196ª and 197ª the slide may be dropped into engagement with the floor surface on the three point contact engagement, and with the ears at the opposite face of the floor plate. Then the slide may be shifted endwise (as by its spring, presently to be described), thus completing the locking operation. The spring tends at all times to maintain the slide in its endwise moved position, with the ears both engaged with the opposite face of the floor, and with the ears moved away from the lateral enlargements 196ª and 197ª, so that there can never be a natural tendency for the slide to become disengaged from the floor plate. Furthermore, the endwise movements normally executed by any slide during shift of its roller between the two positions of such roller are not sufficient to bring the ears again into registry with the lateral enlargements 196ª and 197ª, so there is no possibility of the slide becoming disengaged during such normal operations.

Examination of Figures 6, 7 and 9, in particular shows that one of the slots for the slide 193 (at the bottom face of the floor plate) merges with the slot for the slide 194 (at the top face of the floor plate, but still such merged slot is of such form as to allow for insertion of the respective slides, and locking of them in place, according to the principles so far described.

There are provided the tension springs 199 and 200 for the two slides 193 and 194, and 201 for the slide 195. These springs are connected to the end portions of the lugs 177 of the respective slides, and said springs are suitably anchored to stationary parts of the device, such as the lugs 202 and 203 struck from the floor plate, or the flange 79 of the channel section. These springs tend to urge the respective slides in directions to carry their idler rollers into engagement with the corresponding rotating elements; and I have provided means to control the various slide movements as required to cause the device to execute the several kinds of operations already mentioned.

The slide plate 114 which carries the hub element 115 for the stud 88ª of the element 88 is provided with ears and with an end lug similar to those corresponding elements already described, so special description thereof is not necessary. However the hub 115 of this slide plate extends down through a slotted opening 116 of the floor plate which has already been referred to, and which slotted opening has the portion 116ª extending parallel to the length of the slide, and merging with an angular portion 117 which slants towards the drive head of the motor shaft as well shown in Figures 7 and 9. Also, the slotted opening 204 for the end lug of this slide plate is straight in the direction of the slide's length, so that during endwise travel of such slide plate that end of the slide plate must travel in a straight line. However, both of the slotted openings 205 and 206 for the two ears of this slide plate are laterally enlarged on slanting lines, as well shown in Figures 7 and 9, so that during slide movement with the hub portion 115 engaged with the slotted opening 116, the outer end of the slide (that portion adjacent to the ears) may shift laterally as dictated by the slanting portion of the slotted opening. Thus said slide may execute lateral shift under control of the slotted opening's shape, during endwise shift of such slide. Such lateral shift will cause the stud 88ª (carrying the reel) to execute a movement to carry the flange 97ª directly towards the large diameter section 168 of the motor drive head, so that driving engagement between the flange and such driving surface will be effected under the most advantageous conditions.

Means are provided for controlling the various slide plates, the bell-crank and the brakes to bring them into proper positions for performing each of the various functions already explained. Such means are as follows:

A reciprocable sliding cam plate 207 extends across the front portion of the channel adjacent to the front flange 78 thereof. This cam plate is carried by four posts 208, 209, 210 and 211 secured to the floor 77, each post being shouldered near its top and provided with a reduced top end which extends through a corresponding slot of the slide plate. These are the slots 212, 213, 214 and 215. Suitable screws retain the slide plate in position on said posts. It will be noted that this slide plate extends to the right far enough to control the brake for the element 87 and far enough to the left to control the brake for the element 88, other controls being effected by the intermediate portions of the slide plate.

The control buttons 55 and 56 are carried by the upper ends of vertical rock shafts 216 and 217, respectively, which rock shaft are journalled in the plate 86 by the bushings 218 and 219, and are journalled in the plate or floor 77 by the bushings 220 and 221. A longitudinally extending slot 222 of the slide cam plate 207 accommodates the shaft 216 and is of length sufficient to permit the needed back and forth movements of such cam plate. In Figure 6 there is shown a rearward extension 223 of this slot whose function will presently appear. At its left-hand portion this cam plate is so formed that it lies completely to the rear of the shaft 217 for all back and forth movements of the cam plate.

An arcuate plate 224 is secured to the shaft 216 above the cam plate 207, as well shown in Figures 5, 12 and 13, and others. This plate has the downwardly extending stud 225 which works in the rearward slot extension 223, so that by rocking the shaft 216 through approximately 120 degrees the slide cam plate will be caused to execute a complete traverse from one extreme position to the other. During such rocking movement the stud never leaves the extension slot 223 so that control of the slide cam plate is never lost. The front edge of this arcuate plate 224 has its front edge provided with a series of notches 226 corresponding to the several operating positions to which the button 55 and the rock shaft 216 are to be set; and a stiff leaf spring 227 has its free end suitably formed to drop successively into these notches for "clicking" therein, and to indicate to the operator the correct button positions for selected operations. The right-hand edge portion of this arcuate plate is provided with a circular formed contour, which is, however, provided with a depressed portion 228; and a stud 229 extends down from the link 54 which connects to the short bell-crank arm as well shown in Figure 5 and elsewhere. The spring 151 already referred to urges the long arm of the bell-crank rearwardly, thus tending to shift the link 54 leftwardly, to retain the stud 229 in engagement with the edge portion of the arcuate plate 224. The left-hand end of the link is also slotted or notched as shown at 230 to receive the rock shaft 216, so that the link is maintained in proper leftward alignment; and this notch is long enough to accommodate the full back and forth movements executed by the link.

It will be observed that the tendency of the spring 151 is to maintain at all times a rearward shifting tendency on the bell-crank, thus also tending to press the presser roller against the spindle under spring pressure. The tape guide is also thus shifted rearwardly to its working position. The parts are so proportioned that pressing engagement of the presser roller against the face of the tape will occur under spring pressure at all times during "Playing," the depth of the notch or depressed portion 228 ensuring this possibility.

The right-hand rear portion of the edge of the slide cam plate 207 is provided with a zone 231 for control of the brake shoe 128. This zone is parallel to the direction of slide movement with the exception of a short depression 232; and a stud 233 extends up from the arm 134 of this brake into position for engagement with the edge of the slide cam plate within the zone 231. When the slide has moved to position where said depression 232 registers with the stud the brake arm is allowed to rock counterclockwise under the urging of the spring 140, to thus set the brake, it being noted that the extent of depression is such as to ensure good braking engagement of the shoe 128 against the flange 97 when needed.

To the left of the zone 231 there is another cam zone 234. This zone includes the "low" portion 235 and the "high" portion 236 connected by the slanting portion 237; and the slide plate 195 is provided with the upwardly extending stud 238 which engages with this zone 234 of the slide cam plate. The sections of this zone 234 are so located as to ensure correct functioning of the slide plate 195; it being noted that the spring 201 urges said slide plate to position to maintain the stud 238 in engagement with said zone 234 at all times, and that the extent of stud movement in passing between the "high" and "low" portions is sufficient to ensure that the idler roller 171 shall be retained in engagement with the fly-wheel and with the flange of the element 87 under spring pressure developed by the spring 201 when the "low" portion 235 is in operative position with respect to the stud. When the "high" portion is in operative position the stud is moved far enough to carry the idler roller completely away from both the fly-wheel and the flange 97.

The left-hand rear portion of the edge of the slide cam plate 207 is provided with a zone 239 for control of the brake shoe 129. This zone is parallel to the direction of slide movement with the exception of a short depresson 240; and a stud 241 extends up from the arm 135 of this brake into position for engagement with the edge of the slide cam plate within the zone 239. When the slide has moved to position where said depression 240 registers with the stud the brake arm is allowed to rock clockwise under the urging of the spring 141, to thus set the brake, it being noted that the extent of depression is such as to ensure good braking engagement of the shoe 129 against the flange 97ª when needed.

To the right of the zone 239 there is another cam zone 242. This zone includes the "low" portion 243 and the "high" portion 244 connected by the slanting portion 245; and the slide plate 114 is provided with the upwardly extending stud 246 which engages with this zone 242 of the slide cam plate. The sections of this zone are so located as to ensure correct functioning of the slide plate 114; it being noted that the spring 203ª urges said slide plate to maintain the stud 246 in engagement with said zone 242 at all times, and that the extent of stud movement in passing between the "high" and "low" positions is sufficient to ensure that the slide plate 114 shall be shifted to carry the flange 97ª into engagement with the upper engaging surface of the drive head of the motor under spring pressure developed by the spring 203ª when the "low" portion 243 is in operative position with respect to the stud. When the "high" portion is in operative position the stud is moved far enough to carry the element 88 with its flange 97ª away from driving engagement with the drive head aforesaid.

It will now be seen that this slide cam plate 207 serves the direct functions of controlling the movements of the presser roller and the tape guide into and out of operative positions with respect to the spindle and the interpreting head 53, respectively; and also serves to directly control the functionings of the two brake shoes, the movements of the idler pulley 171, and the movements of the stud 88ª and the element 88 and the reel 52 carried thereby.

The movements of the slide plates 193 and 194 which carry the idler pulleys 169 and 170 must also be controlled in proper relation to the movements already explained, in order to complete the ensemble. Some of these movements of the slide plates 193 and 194 must be effected independently of movements of the slide cam plate 207, and some of them must be effected simultaneously and automatically with such movements of the slide cam plate 207.

The rock shaft 217 for the button 56 carries the lever plate 247 best shown in Figure 5. The slide plate 193 is provided at its front end with the lug 248 which reaches up through an opening 249 in the floor 77, and the front flange 78 is necessary to accommodate the movements which must be executed by this lug. The slide plate 194 is provided at its front end with the upstanding lug 250 which is also capable of executing back and forth movements of sufficient extent to properly control such slide plate without interference with the front flange 78. Examination of Figures 5, 6 and 7 shows that these two lugs 248 and 250 lie at opposite sides of the rock shaft 217 so that they may be controlled by the opposite ends of the lever plate 247. These opposite ends of the lever plate are provided with the forwardly facing engaging faces 251 and 252 which are in proper locations to engage the lugs 248 and 250, respectively, when the rock shaft 217 is rocked clockwise or counterclockwise, as the case may be. With this arrangement it is seen that with the button 56 rocked to its counterclockwise extreme position the lug 250 will be engaged to draw the slide plate 194 forwardly, thus disengaging the idler pulley 170 from the drive head surface 167 and from the fly-wheel, and at the same time permitting the spring 199 to draw the slide plate 193 rearwardly to engage the idler pulley 169 with the drive head surface 166 and with the fly-wheel. Thus "Slow" drive will be effected to the fly-wheel, and thence to other elements. Contrarily, by rocking the button 56 clockwise to its extreme position the lug 248 will be engaged to draw the slide plate 193 forwardly, thus disengaging the idler pulley 169 from the drive head surface 166 and from the fly-wheel, and at the same time permitting the spring 200 to draw the slide plate 194 rearwardly to engage the idler pulley 170 with the drive head surface 167 and with the fly-wheel. Thus "Faster" drive will be effected to the fly-wheel, and thence to other elements. Thus it is possible to effect either slow or faster drive with the button 55 set into position for "Playing."

The slide cam plate 207 is provided with the two edge contact zones 253 and 254 at opposite sides of the rock shaft 217 and in position for engagement with the lugs 248 and 250, respectively, for proper positions of such slide cam plate. In this connection it is noted that when the button 55 is moved to its "Rewind" position, where the flange 97ª of the element 88 is driven directly by engagement with the drive head surface 168, both of the idler pulleys 169 and 170 should be withdrawn from engagement with the drive head surfaces and the fly-wheel, so that the spindle may remain at rest during such rewinding. These contact zones 253 and 254 of the slide cam plate are so positioned that when the slide cam plate is shifted to its extreme leftward position (for "Rewind") these zones will engage the two lugs 248 and 250 simultaneously, thus withdrawing both of the idler wheels 169 and 170 into inoperative positions at such time. This will occur irrespective of the position which the button 56 and its rock shaft 217 then occupy.

It is also noted that when the slide cam plate has been shifted to the right into the "Playing" position, both of these zones 253 and 254 are withdrawn far enough so that neither of them will then interfere with proper movements of the lugs 248 and 250 under the special control of the button 56 and the rock shaft 217 and the lever plate 247. Thus the proper controls for either "Slow" or "Faster" playing may be effected.

The front edge of the lever plate 247 is provided with a suitable notch or notches for engagement by the free end of a stiff leaf spring 255 which spring is suitably anchored to the flange 78. These notches correspond to the two operative positions of the button 56, "Slow" and "Faster."

In Figures 16 and 17 I have shown a modified form of control element for the rock shaft 217 for "Slow" and "Faster." In this case I have provided the short finger piece or lever 256 connected to the upper end of such rock shaft in position for convenient finger manipulation into either of the two significant positions.

In Figure 22 I have shown on approximately double size one of the guide studs 72 and 73 which guide the tape past the sensing head when the tape guide 54 is in its forward or inoperative position. Each of these studs is provided with a section of reduced size 257, wide enough to accommodate the width of the tape to be used (for example, ¼ inch tape), and the upper and lower edges of this reduced width section 257 are slanted as well shown in Figure 22 on a slant of substantially 30 degrees to the horizontal, as shown at 258 and 259. Preferably these slanting portions do not carry clear to the cylindrical surface portion, so that small radial upper and lower faces 260 and 261 are provided for direct engagement by the edges of the passing tape, to thus effectively retain said tape in correct registering position with respect to the sensing head during interpretation. These surfaces 260 and 261 may be spaced very slightly greater apart than the width of the tape so as to accommodate slight irregularities in the tape width without danger of binding of the tape between said surfaces, and without fraying of the tape edges.

In Figure 24 I have shown schematically a simple form of wiring diagram for control of the driving motor by a switch acted upon by the main control button 55 and its rock shaft 216. In this case the motor armature is shown at 262 and its winding at 263, a simple form of alternating current motor, such as a shaded pole motor being indicated. The terminals of the winding are brought out at 264 and 265, one being carried direct to the line 266, and the other to the switch 267, which switch is in turn connected to the other line 268. The rock shaft 216 carries the cam element 269 which will engage one of the switch elements 270 to control the opening and closing of the switch, the switch shown being of the leaf spring type in which the leaf 270 is biased to normally move to open position when relieved. The cam element 269 is provided with a "Low" zone 271 so located as to permit the switch to move to open position when the button 55 and rock shaft 216 are set to the "Stop" position; but when the said button and rock shaft are moved to any of the operating positions the cam element will cause the switch leaf 270 to move to the circuit closing position, thus ensuring supply of current to the motor for all operating positions of the button 55.

In Figures 24 to 33, inclusive, I have shown the various positions to which the main operative parts are moved, corresponding to the five positions of the control button 55, and for both of the positions of the button 56 for each of such button 55 positions. The positions of the buttons 55 and 56 are indicated by the short arrows drawn through them. It seems unnecessary to describe these various figures in detail, since their significance will be well understood in the light of previous description herein.

Conveniently a shield or housing 272 may be set over the sensing head, said shield being open at its front so that the tape may be pressed against the sensing head during operation. This shield also covers and protects the spindle. I have shown the shield 273 set over the front portion of the top plate 89, and covering and protecting the tape guide and the presser roller, and also providing suitable surfaces on which the several operative positions of the buttons 55 and 56 may be indicated. These shields, when provided, also serve to improve the appearance of the unit, and to give it a finished appearance.

Each of the slide plates 193, 194, 195 and 114 is permitted a slight amount of freedom in its movements as controlled by the engagement of its ears with the slots of the floor 77 so as to allow such small degree of tilting or other movement as may be necessary to ensure good frictional engagement of its friction wheel with both of the elements which are engaged by such friction wheel. Thus each friction wheel will come into good frictional engagement with both of the elements which it should engage and under spring pressure against both of such elements.

I have indicated an opening 274 is the floor 77 through which opening the necessary wires connecting to the sensing head may be passed without interference with various of the operating elements.

Referring especially to Figures 5, 6 and 7, as well as various of the other figures, the operating parts are shown in their "Stop" positions, that is, the idle condition of the device. Therein the stud 233 for the brake 128 is lowered into the depression 232 so that the receiving reel support brake is set. The stud 238 for the slide plate 195 is on the "high" portion of the zone 234 so that the friction roller 171 is disengaged. Likewise the stud 246 is on the "high" portion of the zone 242 so that the delivery reel support has been moved away from direct drive by the motor drive head. Likewise the stud 241 is on the "high" portion of its zone, so that the brake 129 for the delivery reel support is released. Under these conditions also the stud 229 of the link 154 rides on the circular portion of the edge of the plate 224 carried by the rock shaft 216, so that the link 154 is forced to the right, thus rocking the bell-crank towards the front flange 78, and moving the tape guide and the presser roller away from the sensing head and from the spindle, respectively. In this position the surfaces or edge portions of the slide cam plate 207, such portions being indicated at 253 and 254, are in position to draw both of the slides 193 and 194 forwardly, thus removing their friction idler wheels from engagement with the motor drive head and the fly-wheel. Also, the current supply to the driving motor is discontinued.

Upon rocking the shaft 216 counterclockwise to bring it to the "R. W." position, the slide cam plate 207 is moved slightly towards the left from its previously considered position. Such movement will cause the brake 128 to be released, will not allow the stud 238 to drop down so the idler roller 171 will not be engaged with either the fly-wheel or the flange 97, both of the slide plates 193 and 194 will remain in their forward positions so the idler rollers 169 and 170 will both remain inoperative, the stud 229 will continue to ride on the circular portion of the edge of the plate 224, so that the bell-crank will still retain the tape guide and the presser roller in their inoperative positions, and the stud 241 will continue to ride on a "high" portion of the slide cam plate 207 so that the brake 129 will continue to be inoperative. However, the stud 246 will now ride down over the slanting portion 245 of the slide cam plate, to an elevation low enough to allow the slide plate 114 to bring the flange 97 of the delivery reel support into engagement with the motor drive head surface 168, thus driving the delivery reel reversely and at high speed for "Rewind."

Such movement of the slide cam plate to the "R. W." position was effected by rock of the button 55 counterclockwise one notch from its stopped position first described. To go to the various other operating positions the button and its rock shaft must be rocked clockwise from the stopped position. Moving these controls to the "P." or playing position we find the following conditions to obtain: The slide cam plate will now be moved rightwardly from the positions shown in Figures 5, 6 and 7, and others. At this playing position the depression 232 will ride away from under the stud 233, thus releasing the brake 128, the stud 238 will still ride on the "High" portion 236 so that the roller 171 will remain in its inoperative position, the plate 224 will now have rotated to position to carry its "Low" point 228 into position to allow the stud 229 to move leftwardly enough to allow such an amount of bell-crank rock as will ensure movement of the tape guide and the presser roller into operative positions, both of the studs 241 and 246 will be retained on the "High" portion 242 of the slide cam plate so that the brake 129 will remain released and the slide plate 114 will be retained rearward to hold the flange 97 away from the motor drive head surface, and both of the edge portions 253 and 254 of the slide cam plate will have moved rightwardly sufficient to allow both of the slide plates 193 and 194 to move rearwardly into their respective operating positions. However, the button 56 and its rock shaft 217 will be standing in one of their two operative positions so that one or the other of these slide plates will be retained against its rearward movement, and thus its roller, 169 or 170, as the case may be, will be retained inoperative. Accordingly the drive to the fly-wheel will be at either "S" or "F" according to the setting of the button 56. By shifting the position of this button the drive rate may be changed to the other condition without any change in the position of the button 55.

Upon moving the button 55 and its rock shaft 216 to their next position (for "A"), all of the just described functions will remain the same with the exceptions following; the stud 241 will be allowed to drop into the depression 240 of the slide cam plate, thus setting the brake 129; and the depressed portion 228 of the plate 224 will move away from the stud 229 of the link 54, causing said stud to ride onto the high or circular portion of said plate. This will force the link 54 to the right, rocking the bell-crank forwardly, and carrying both the tape guide and the presser roller into their non-operative positions. Under these conditions "Advance" of the tape forwardly may be effected without interpretation, and without engagement of the tape with either the sensing head or the spindle. Under these conditions, too, the button 56 may be set to either its "S" or "F" position, to bring either the roller 169 or the roller 170 into effect for either slow or fast advance.

By moving the button 55 to its position "F. A." the following conditions will obtain: the "High" portion 236 of the slide cam plate 207 will ride so far to the right that the stud 238 will be allowed to move down at the left end thereof, far enough to permit the slide plate 195 to carry its roller 171 into operative position for fast drive of the flange 97 for fast advance of the tape onto the reel 51. The brakes 128 and 129 will both be retained in inoperative positions, and the bell-crank will still be retained in its forward position with the tape guide and the presser roller inoperative. During this driving condition the friction drive through the pulley 109 is shunted, and the rotational speed of the receiving reel is much higher than previously. Also, since the drive of the roller 171 is made by engagement thereof with the fly-wheel, it follows that either of the button positions "S" or "F" of the button 56 may be brought into use. Thus, when operating with the button 55 set to "F. A." and with the button 56 set to "F" a very fast advancing operation may be secured.

In the modified form of fly-wheel shown in Figure 15 the upper and lower cup-shaped sections 275 and 276 are joined together by the hollow rivet element 278 through which the shaft is extended. In order to add to the rotational inertia of this form of fly-wheel while at the same time not using sheet metal of excessive thickness for the two cups 275 and 276, I have shown the ring insert 277 set into the outer peripheral portion of the element 276, the thickness of this insert being selected of amount to give the desired total rotational inertia.

In Figure 23 I have shown the wires 279, 280, 281 and 282 extending from the sensing unit 53, these wires being properly connected to the windings for the pole pieces 62 and 63 for connection of these windings to the proper circuits. These wires may be extended through the opening 274 in the floor of the chassis and thence carried to the proper circuits (not shown).

I claim:

1. In a device of the class described the combination of a sensing head, a spindle element laterally adjacent thereto at one side thereof including a spindle and including a pulley co-axial with the spindle and having a cylindrical surface, a tape guide facing the sensing head and movable towards and from the sensing head, a presser roller facing the spindle at one side of the tape guide, a carrier for both the tape guide and the presser roller, means to movably support said carrier for movement of both the tape guide and the presser roller towards and away from the sensing head and the spindle, respectively, a delivery reel and a receiving reel for tape located at opposite sides of the parts aforesaid, means to support each of said reels, a driving motor, having its shaft substantially parallel to the spindle, a driving pulley on said motor shaft, said driving pulley having two pulley driving surfaces of different diameters and axially displaced from each other, each of said driving surfaces lying in a plane normal to the spindle axis and the motor shaft and both of said planes intersecting the cylindrical surface of the spindle shaft pulley, an idler wheel located in each of said planes and being of size to simultaneously engage the cylindrical surface of the spindle pulley and the motor shaft pulley surface which lies in the plane of such idler wheel, and means to cause driving engagement of either idler wheel with the motor shaft pulley surface which lies in the plane of such idler wheel and with the spindle cylindrical pulley surface, and to simultaneously cause driving disengagement of the other idler wheel from the motor shaft pulley surface which lies in the plane of such other idler wheel and the spindle cylindrical pulley surface, and means to drive the receiving reel supporting means from the spindle element, said last named means including friction means yieldable during drive, to thereby permit rotation of the receiving reel at a rate slower than the free driving rate of the receiving reel for any rotational rate of the spindle.

2. Means as specified in claim 1, together with friction means to resist rotation of the delivery reel during withdrawal of tape from such reel to thereby retain the tape under tension proportional to such friction means.

3. Means as specified in claim 1, together with another friction idler wheel, means to support the same, and means to engage said friction wheel with the cylindrical pulley surfaces of the spindle element and with the receiving reel supporting means for direct drive of the receiving reel without inclusion of said friction yieldable means.

4. Means as specified in claim 3, wherein the speed ratio of drive of said last named friction idler wheel drive is greater than the speed of drive to the receiving reel first specified.

5. Means as specified in claim 1, wherein said spindle pulley element comprises a fly-wheel of relatively large mass.

6. In a device of the class described, the combination of a sensing head, a spindle laterally adjacent thereto at one side thereof, a tape guide facing the sensing head and movable towards and from the sensing head, a presser roller facing the spindle at one side of the tape guide, a carrier for both the tape guide and the presser roller, means to movably support said carrier for movement of both the tape guide and the presser roller towards and away from the sensing head and the spindle, respectively, a delivery reel and a receiving reel for tape located at opposite sides of the parts aforesaid, means to rotatably support each of said reels, a driving motor, said driving motor including driving surfaces of at least two diameters, two friction idler wheels corresponding to said two diameter driving surfaces, a slide plate for each of said friction idler wheels, means to journal each idler wheel on its slide plate, a driven surface of uniform diameter in connection with the spindle and in position for engagement by either of said idler wheels selectively, means to move said slide plates to cause driving engagement of a selected idler wheel with the corresponding driving motor driving surface and with the said driven surface which is in connection with the spindle, or to cause disengagement of both idler wheels from driving engagement with the driving motor driving surfaces and the spindle driven surface, means to drive the receiving reel supporting means including a driving connection to the spindle element, and means to move the carrier for the tape guide and the presser roller to carry said tape guide and said presser roller into co-operative positions with the sensing head and the spindle, respectively, when said idler selecting means is in either idler selected position, a support for said slide plates, said support-comprising a plate whereon the slide plates are slidably mounted, there being a plurality of slots in said supporting plate adjacent to the location of each slide plate, together with ears on each slide plate offset from the plane of said slide plate to reach through corresponding slots of the supporting plate for engagement of said ears with the face of the supporting plate opposite to the location of each slide plate.

7. Means as specified in claim 6, together with means to effect drive from the spindle element to the receiving reel at either of two selected ratios of drive between said parts.

8. Means as specified in claim 6, together with means to effect driving engagement between a driving motor driving surface and the delivery reel support when both of the slide plates aforesaid are in position to disengage both idler wheels from driving engagements between the motor driving surfaces and the spindle driven surface, braking means in connection with the receiving reel support, other braking means in connection with the delivery reel support, means to make operative said delivery reel braking means when the drive from the driving motor to the delivery reel supporting means is inoperative, and means to make operative said receiving reel braking means when the drive from the driving motor to the receiving reel supporting means is inoperative.

9. In a device of the class described the combination of a delivery reel support, a receiving reel support, means to journal each of said supports for rotation, a disk connected to and rotatable with the delivery reel support, a stationary plate element beneath said disk, an annular sheet of friction brake material between said delivery reel support disk and said stationary plate element, a disk connected to and rotatable with the receiving reel support, brake means for each of said reel supports, independent means to actuate each brake means to braking position, a driving motor, a sensing head between the two reel supports, a spindle adjacent to said sensing head at a position between the sensing head and the receiving reel, a presser roller in conjunction with said spindle to press a tape drivingly against the spindle, tape guide means for the tape in position adjacent to the sensing head, means to normally move the presser roller and the tape guide means towards the spindle and towards the sensing head, respectively, said moving means including yieldable spring means, a rotatable disk beneath the receiving reel support disk aforesaid, an annular sheet of friction brake material between the receiving reel support disk and the rotatable disk aforesaid, a driving connection between the spindle and said rotatable disk aforesaid effective to drive said disk in a rotational direction for reeling of tape delivered by rotational movement of the spindle, a driving connection from the driving motor to the spindle to drive the spindle in direction to deliver tape to said receiving reel element, said driving means including friction drive elements between the driving motor and the spindle element, other friction drive elements from the spindle to the receiving reel support effective to drive the receiving reel support in direction to draw tape from the delivery reel, means under control of the operator to make effective said drive means which includes the spindle and the rotatable disk and ineffective said other receiving reel support drive means or to make effective said other receiving reel support drive means and ineffective said first mentioned receiving reel support drive means, selectively, or to make all of said drive means ineffective, selectively.

JOHN VICTOR NELSON.

References Cited in the file of this patent

UNITED STATES PATENTS

| Number | Name | Date |
|---|---|---|
| 2,518,769 | Goy | Aug. 15, 1950 |
| 2,528,061 | Knapp | Oct. 31, 1950 |
| 2,538,893 | Begun | Jan. 23, 1951 |
| 2,539,858 | Offutt | Jan. 30, 1951 |
| 2,555,643 | Harrison | June 5, 1951 |